(12) United States Patent
He et al.

(10) Patent No.: US 12,052,741 B2
(45) Date of Patent: Jul. 30, 2024

(54) METHODS OF RESOURCE RE-SELECTION AND PRE-EMPTION

(71) Applicant: Apple Inc., Cupertino, CA (US)

(72) Inventors: Hong He, San Jose, CA (US); Chunxuan Ye, San Diego, CA (US); Dawei Zhang, Saratoga, CA (US); Wei Zeng, Saratoga, CA (US); Yuchul Kim, San Jose, CA (US); Haitong Sun, Cupertino, CA (US); Weidong Yang, San Diego, CA (US); Oghenekome Oteri, San Diego, CA (US); Chunhai Yao, Beijing (CN); Yushu Zhang, Beijing (CN); Yang Tang, San Jose, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/267,352

(22) PCT Filed: Feb. 12, 2020

(86) PCT No.: PCT/CN2020/074911
§ 371 (c)(1),
(2) Date: Feb. 9, 2021

(87) PCT Pub. No.: WO2021/159321
PCT Pub. Date: Aug. 19, 2021

(65) Prior Publication Data
US 2022/0377748 A1    Nov. 24, 2022

(51) Int. Cl.
*H04W 72/542* (2023.01)
*H04W 72/02* (2009.01)
*H04W 72/56* (2023.01)

(52) U.S. Cl.
CPC ......... *H04W 72/542* (2023.01); *H04W 72/02* (2013.01); *H04W 72/56* (2023.01)

(58) Field of Classification Search
CPC .... H04W 72/542; H04W 72/56; H04W 72/02
See application file for complete search history.

(56) References Cited

U.S. PATENT DOCUMENTS

2019/0387377 A1* 12/2019 Zhang ................. H04W 4/44
2020/0029245 A1   1/2020 Khoryaev
(Continued)

FOREIGN PATENT DOCUMENTS

WO    2017/171909 A1   10/2017

OTHER PUBLICATIONS

MCC Support; Draft Report of 3GPP TSG RAN WG1 #98bis v0.1.0; 3GPP TSG RAN WG1 Meeting #99, R1-191xxxx; Nov. 18, 2019.
(Continued)

*Primary Examiner* — Won Tae C Kim
(74) *Attorney, Agent, or Firm* — Eschweiler & Potashnik, LLC

(57) ABSTRACT

An apparatus configured to be employed in a user equipment (UE) associated with a new radio (NR) system is disclosed. The apparatus comprises one or more processors configured to select a first resource from a candidate resource set comprising a plurality of candidate resources within a first resource selection window. In some embodiments, the first resource is to be utilized by the UE for a first transmission of a transport block (TB) over sidelink. In some embodiments, a size of the first resource selection window is derived based on a (pre)configured maximum number of retransmissions of the TB. In some embodiments, the one or more processors is further configured to generate a first transmission signal comprising the first transmission of the TB, to be transmitted over the sidelink using the selected first resource.

20 Claims, 18 Drawing Sheets

(56) References Cited

U.S. PATENT DOCUMENTS

| | | | |
|---|---|---|---|
| 2020/0029340 A1 | 1/2020 | He et al. | |
| 2020/0305165 A1* | 9/2020 | Inokuchi | H04W 88/04 |
| 2020/0359389 A1* | 11/2020 | Bharadwaj | H04W 4/70 |
| 2021/0144681 A1* | 5/2021 | Gulati | H04W 24/08 |
| 2021/0243796 A1* | 8/2021 | Panteleev | H04L 1/1858 |
| 2022/0303952 A1* | 9/2022 | Hoang | H04L 5/0005 |
| 2022/0394560 A1* | 12/2022 | Yu | H04W 72/0446 |
| 2022/0394735 A1* | 12/2022 | Lee | H04W 72/1263 |

OTHER PUBLICATIONS

MCC Support; Final Report of 3GPP TSG RAN WG1 #98 v2.0.0; 3 GPP TSG RAN WG1 Meeting #98bis; R1-1911429; Oct. 14, 2019.

MCC Support; Final Report of 3GPP TSG RAN WG1 #98bis v1.0.0; 3GPP TSG RAN WG1 Meeting #99; R1-1911801; Nov. 18, 2019.

MCC Support; Final Report of 3GPP TSG RAN WG1 #98bis v2.0.0; 3 GPP TSG RAN WG1 Meeting #99; R1-1913275; Nov. 22, 2019.

[98b-NR-15] Maximum number of reserved resources for a TB; 3gpp_tsg_ran_wg1: tsg ran working group 1; Nov. 5, 2019.

[98b-NR-16] Resource selection and sensing windows bounds; 3gpp_tsg_ran_wg1: tsg ran working group 1; Nov. 6, 2019.

LG Electronics; "Task List for 5G V2X in RAN1#100"; 3GPP TSG RAN #86; Stiges, Spain; Dec. 9-12, 2019; RP-193198.

Apple; "Remaining Details on Resource Allocation for Mode 2"; 3GPP TSG RAN WG1 #100; Athens, Greece; Feb. 24-28, 2020; R1-200xxxx.

Chairman Balazs Bertenyi; "Chairman's Notes, 3GPP TSG RAN #86"; Dec. 9, 2019; Stiges, Spain.

3GPP; "Multiplexing and Channel Coding (Release 16)"; Technical Specification Group Radio Access Network; 3GPP TS 38.212; V16.0.0; Dec. 2019.

3GPP; "Physical layer procedures for control (Release 16)"; Technical Specification Group Radio Access Network; 3GPP TS 38.213; V16.0.0; Dec. 2019.

3GPP; "Physical layer procedures for data (Release 16)"; Technical Specification Group Radio Access Network; 3GPP TS 38.214; V16.0.0; Dec. 2019.

ETSI; "Multiplexing and channel coding (3GPP TS 38.212 version 15.8.0 Release 15)"; ETSI TS 138 212; V15.8.0; Jan. 2020.

ETSI; "Physical layer procedures for control (3GPP TS 38.213 version 15.8.0 Release 15)"; ETSI TS 138 213; V15.8.0; Jan. 2020.

ETSI; "Physical layer procedures for data (3GPP TS 38.214 version 15.8.0 Release 15)"; ETSI TS 138 214; V15.8.0; Jan. 2020.

ETSI; "Medium Access Control (MAC) protocol specification (3GPP TS 38.321 version 15.8.0 Release 15)"; ETSI TS 138 321; V15.8.0; Jan. 2020.

3GPP; "3GPP TSG SA Meeting #86"; Stiges, Spain; Dec. 10-13, 2019.

MCC Support; "Final Report of 3GPP TSG RAN WG1 #86 v1.0.0"; 3GPP TSG RAN WG1 Meeting #86bis; Lisbon, Portugal; Oct. 10-14, 2016.

MCC Support; "Final Report of 3GPP TSG RAN WG1 #86bis v1.0.0"; 3GPP TSG RAN WG1 Meeting #87; Reno, USA; Nov. 14-18, 2016.

LG Electronics; "Task list for 5G V2X in RAN1#100"; 3GPP TSG RAN #86; Stiges, Spain; Dec. 9-12, 2019.

International Search Report dated Oct. 29, 2020 for International Application No. PCT/CN2020/074911.

"Design of Resource Allocation Mode-2 for NR V2X Sidelink Communication." Source: Intel Corporation. AGenda item: 7.2.4.2.2 3GPP TSG RAN WG1 Meeting #99, Reno, USA, Nov. 18-22, 2019. R1-1912205.

"Resource Allocation for Mode 2." Source: Apple. Agenda Item: 7.2.4.2.2. #GPP TSG RAN WG1 #99, Reno, USA, Nov. 18-22, 2019. R1-1912812.

"Sidelink Resource Allocation Mode-2 Design for NR V2X Communication." Source: Intel Corporation. Agenda item: 7.2.4.2.2. 3GPP TSG RAN WG1 Meeting #97, Reno, USA, May 13-17, 2019. R1-1906796.

"Resource Allocation Mode-2 for NR V2X Sidelink Communication." Source: Intel Corporation. Agenda Item: 7.2.4.2.2. 3GPP TSG RAN WG1 Meeting #98 bis, Chongqing, China, Oct. 14-20, 2019. R1-1910650.

Freeland, Graham et al. "Device-to-Device Communication Aids Public Safety." Microwaves & RF. Mar. 9, 2017. https://www.mwrf.com/technologies/software/article/21848167/devicetodevice-communication-aids-public-safety.

"LTE Advanced—D2D Radio Protocol." LTE Advanced D2D ShareTechnote. http://www.sharetechnote.com/html/LTE_Advanced_D2D_Radio.html.

"LTE Basic Procedure." ShareTechnote. 3. https://www.sharetechnote.com/html/BasicProcedure_LTE_HARQ.html.

"Hybrid automatic repeat request." Wikipedia. 4. https://en.wikipedia.org/wiki/Hybrid_automatic_repeat_request.

Amberkar, Samir. "C-V2X Autonomous Resource Selection Explained." Sasken Technologies Limited. Whitepaper.

"Cellular-V2X Technology Overview." 80-PE732-63 Rev B. Qualcomm Technologies, Inc. 2019.

Jeon, Yongseok, et al. Reducing Message Collisions in Sensing-Based Semi-Persistent Scheduling (SPS) by Using Reselection Lookaheads in Cellular V2X. Sensors. Nov. 9, 2018. MDPI.

"LTE Sidelink Communications." TLEN 5803-AWL Advanced Wireless Lab. Lecture Slides, Mar. 14, 2017. LTE Sidelink Communications Proximity Services (ProSe) Device-to-Device Comms (D2D).

Apple; "On Mode 2 Resource Allocation for NR Sidelink"; 3GPP TSG RAN WG1 #98bis; R1-1910962; Oct. 14, 2019.

European Extended Search Report mailed Apr. 28, 2023 in connection with Application No. 20918280.

Catt; "Discussion on resource allocation mechanism for sidelink Mode 2 in NR V2X"; 3GPP TSG WG1 #99; R1-1912155; Nov. 18, 2019.

OPPO; "Discussions on resource reservation, sensing and selection in Mode 2"; 3GPP TSG-RAN WG1 Meeting #99; R1-1912794; Nov. 18, 2019.

Intel Corporation; "Design of Resource Allocation Mode-2 for NR V2X Sidelink Communication"; 3GPP TSG-RAN WG1 Meeting #99; R1-1912205; Nov. 18, 2019.

Intel Corporation; Resource Allocation Mode-2 for NR V2X Sidelink Communication; 7.2.4.2.2; Discussion and Decision; 3GPP TSG RAN WG1 Meeting #98bis; R1-1910650; Chongqing, China, Oct. 14-20, 2019.

Intel Corporation; Design of Resource Allocation Mode-2 for NR V2X Sidelink Communication; 7.2.4.2.2; Discussion and Decision; 3GPP TSG RAN WG1 Meeting #99; R1-1912205; Reno, USA, Nov. 18-22, 2019.

Chinese Office Action, Mailed Date: Dec. 1, 2023, in connection with Chinese Patent Application No. 202080004536.4.

* cited by examiner

US 12,052,741 B2

METHODS OF RESOURCE RE-SELECTION AND PRE-EMPTION

FIELD

The present disclosure relates to the field of 5G new radio (NR) vehicle-to-everything (V2X) communication systems, and in particular, to a system and method for resource re-selection and pre-emption in 5G NR V2X communication systems.

BACKGROUND

Vehicle-to-everything (V2X), referring to Vehicle-to-Vehicle (V2V), Vehicle-to-Pedestrian (V2P) and Vehicle-to-Infrastructure (V2I) communications, is a wireless technology aimed at enabling data exchanges between a vehicle and its surroundings. New radio (NR) vehicle-to-everything V2X aims to support unicast, groupcast and broadcast communication over the sidelink. In some embodiments, the sidelink refers to a communication mechanism (e.g., a communication channel) between 2 devices (e.g., two V2X UEs) without going through a base station (e.g., a gNodeB), V2X allows vehicles to communicate with each other to support various V2X applications, such as safety applications and autonomous operation/driving applications. V2X applications typically require high reliability of packet delivery within a predefined target communication range, and typically require very low latency packet delivery.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
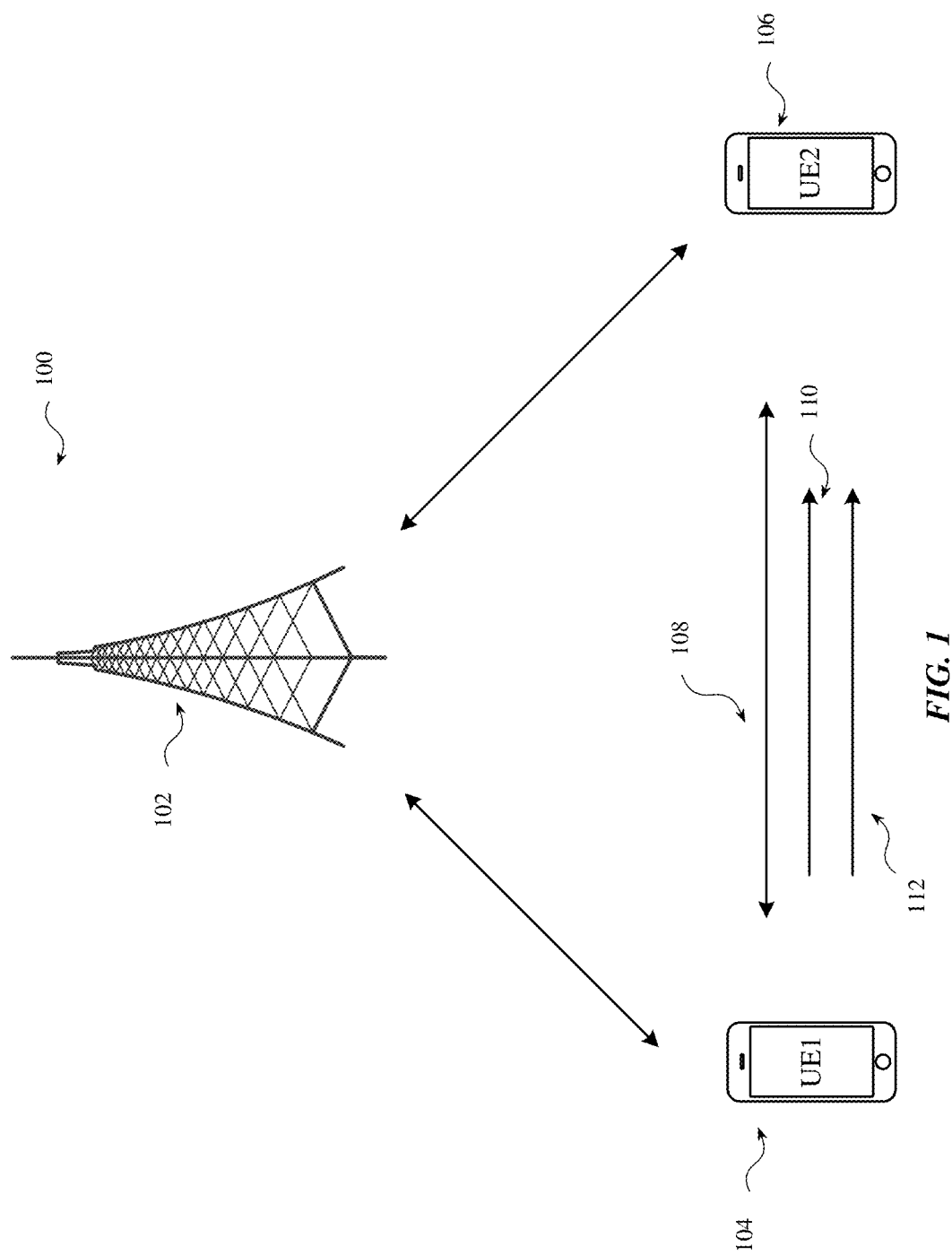
FIG. 1 illustrates a simplified block diagram of a new radio (NR) system, according to one embodiment of the disclosure.

In one embodiment of the disclosure, an apparatus configured to be employed in a user equipment (UE) associated with a new radio (NR) system is disclosed. The apparatus comprises one or more processors configured to select a first resource from a candidate resource set comprising a plurality of candidate resources within a first resource selection window. In some embodiments, the first resource is to be utilized by the UE for a first transmission of a transport block (TB) over sidelink. In some embodiments, a size of the first resource selection window is derived based on a (pre) configured maximum number of retransmissions of the TB. In some embodiments, the one or more processors is further configured to generate a first transmission signal comprising the first transmission of the TB, to be transmitted over the sidelink using the selected first resource.

In one embodiment of the disclosure, an apparatus configured to be employed in a user equipment (UE) associated with a new radio (NR) system is disclosed. The apparatus comprises one or more processors configured to select a candidate resource set comprising a plurality of candidate resources from a resource selection window comprising a plurality of resources, to be utilized by the UE for a transmission of a transport block (TB) over sidelink using a subset of candidate resources within the candidate resource set. In some embodiments, the plurality of candidate resources within the candidate resource set comprises one or more reserved resources comprising resources that are reserved by one or more other UEs. In some embodiments, the one or more reserved resources are chosen from the resource selection window, in accordance with a data priority level of the one or more reserved resources.

In one embodiment of the disclosure, an apparatus configured to be employed in a user equipment (UE) associated with a new radio (NR) system is disclosed. The apparatus comprises one or more processors configured to receive a pre-emption message from another UE, that forms a pre-empting UE. In some embodiments, the pre-emption message indicates an intention to utilize a reserved resource associated with the UE, wherein the reserved resource comprises a pre-empted resource that is chosen for data transmission by the pre-empting UE. In some embodiments, the one or more processors is further configured to selectively continue transmission of a data associated with the UE using the pre-empted resource, based on a time of reception of the pre-emption message at the UE.

In one embodiment of the disclosure, a method for a user equipment (UE) associated with a new radio (NR) system is disclosed. The method comprises selecting a first resource from a candidate resource set comprising a plurality of candidate resources within a first resource selection window, using one or more processors. In some embodiments, the first resource is to be utilized by the UE for a first transmission of a transport block (TB) over sidelink. In some embodiments, a size of the first resource selection window is derived based on a (pre)configured maximum number of retransmissions of the TB. In some embodiments, the method further comprises generating a first transmission signal comprising the first transmission of the TB, using the one or more processors, wherein the first transmission signal is to be transmitted over the sidelink using the selected first resource.

In one embodiment of the disclosure, a method for a user equipment (UE) associated with a new radio (NR) system is disclosed. The method comprises selecting a candidate resource set comprising a plurality of candidate resources from a resource selection window comprising a plurality of resources, using one or more processors, to be utilized by the UE for a transmission of a transport block (TB) over sidelink using a subset of candidate resources within the candidate resource set. In some embodiments, the plurality of candidate resources within the candidate resource set comprises one or more pre-empted resources comprising resources that are reserved by one or more other UEs, that forms one or more pre-empted UEs. In some embodiments, the method further comprises choosing, using the one or more processors, the one or more reserved resources from the resource selection window, in accordance with a data priority level of the one or more reserved resources.

In one embodiment of the disclosure, a method for a user equipment (UE) associated with a new radio (NR) system is disclosed. The method comprises receiving a pre-emption message from another UE, that forms a pre-empting UE, using one or more processors. In some embodiments, the pre-emption message indicates an intention to utilize a reserved resource associated with the UE, and wherein the reserved resource comprises a pre-empted resource that is chosen for data transmission by the pre-empting UE. In some embodiments, the method further comprises selectively continuing transmission of a data associated with the UE using the pre-empted resource, using the one or more processors, based on a time of reception of the pre-emption message at the UE.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As indicated above, V2X applications typically require high reliability of packet delivery within a predefined target communication range, and typically require very low latency packet delivery. NR V2X sidelink supports unicast, groupcast and broadcast transmissions. In order to improve the efficiency of V2X communications over sidelink, NR V2X supports a predefined number of transmissions (e.g., up to 32 transmissions) of a single transport block (TB). In some embodiments, the TB refers to a single block of data. In some embodiments, retransmitting the TB multiple times enables to ensure a successful reception of the TB at a receiver UE. In some embodiments, the retransmissions could be blind retransmissions, where the UE is configured to retransmit the TB for a predefined number of times. Alternately, the retransmissions could be hybrid automatic repeat request (HARQ) based retransmissions, where the UE is configured to retransmit based on receiving acknowledgement (ACK)/negative acknowledgement (NACK) from another UE (e.g., the receiver UE) over the sidelink. In some embodiments, a maximum number of re-transmissions of a TB is configured per priority per channel busy ratio (CBR) range per transmission resource pool. In some embodiments, the priority of the TB is signaled in sidelink control information (SCI) received from a receiver UE. In the embodiments described throughout the disclosure, a transmit (Tx) UE refers to a UE that is transmitting/re-transmitting the TB over the sidelink and a receive (Rx) UE refers to a UE that is receiving the TB over the sidelink.

Prior to transmitting the TB, in some embodiments, the Tx UE needs to determine one or more resources (e.g., radio resources) to be utilized for the transmission/re-transmission of the TB. In NR V2X communications, two resource selection modes are defined. In a first mode, a cellular network (e.g., gNodeB) selects and manages radio resources used by vehicles (e.g., user equipments or UEs) for their direct V2X communications. In a second mode, the vehicles (e.g., the UEs) autonomously select the radio resources for their direct V2V communications. In the second mode, the UE can operate without cellular coverage, and is therefore considered the baseline V2X mode since safety applications cannot depend on the availability of cellular coverage. Typical procedure for UEs that select the radio resources autonomously includes a sensing procedure and a resource selection procedure. The sensing procedure occurs in a sensing window, where the Tx UE decodes SCI from one or more other UEs and also performs sidelink reference signal receive power (SL-RSRP) measurement.

In some embodiments, the SCI from the one or more other UEs provides information of one or more resources that are reserved by the one or more other UEs and the SL-RSRP measurement of the one or more resources provides an indication of how close the other UEs are to the Tx UE or how strong the signals from the other UEs are. In some embodiments, the sensing procedure provides information that enables the Tx UE to identify one or more candidate resources that can be utilized for the transmission/retransmission of a TB from the Tx UE. For example, a resource is not considered as a candidate resource if the resource is indicated in a received SCI and the associated L1 SL-RSRP measurement is above an SL-RSRP threshold. The resource selection procedure involves identifying the one or more candidate resources within a resource selection window that follows the sensing window, and selecting resources for transmission/re-transmission from the identified candidate resources within the resource selection window. In some embodiments, the sensing window is designed to end a few time slots before the resource selection window, in order to ensure resource selection/re-selection processing time, thereby enabling the Tx UE to identify the one or more candidate resources within the resource selection window.

Embodiments herein relate to systems and methods for autonomous selection of resources for retransmissions. In particular, in a first embodiment, a method that select a single resource from a first resource selection window is disclosed. Further, in a second embodiment, a method that select multiple resources from a first resource selection window is disclosed. Example embodiments further include methods to determine a size/duration of the resource selection window, methods for selection of multiple resources from a single resource selection window and methods for resource reservation scheme. In addition, example embodiments include a method for identifying a set of candidate resources from a resource selection window based on pre-emption and a method for a pre-empted UE.

FIG. 1 illustrates a simplified block diagram of a new radio (NR) system 100, according to one embodiment of the disclosure. In some embodiments, the NR system 100 facilitates to determine one or more resources to be utilized for a transmission or a retransmission of a transport block (TB) over sidelink. The NR system 100 comprises a gNodeB 102, a first user equipment (UE) 104 and a second UE 106. In other embodiments, however, the NR system 100 can comprise a plurality of UEs, for example, more than two UEs, and is not shown here for clarity purposes. In some embodiments, the gNodeB 102 is equivalent to a base station, e.g., an eNodeB in LTE systems etc. In some embodiments, the first UE 104 and the second UE 106 may comprise a vehicle-to-everything (V2X) UE. However, in other embodiments, the first UE 104 and the second UE 106 may comprise a mobile phone, tablet computer, an internet of things (IoT) device etc. The first UE 104 and the second UE 106 are configured to communicate with the gNodeB 102 over a communication medium (e.g., air). Similarly, the first UE 104 and the second UE 106 are configured to communicate with one another over a communication medium (e.g., air).

In some embodiments, the first UE 104 is configured to transmit a transport block (TB) to the second UE 106 over the sidelink channel 108, alternately referred to as the sidelink 108. In this embodiment, for the ease of reference, the first UE 104 is referred to as a transmit (Tx) UE 104 that is configured to transmit a TB and the second UE 106 is referred to as a receive (Rx) UE 106 that is configured to receive the TB. However, in other embodiments, the first UE 104 may comprise a Rx UE and the second UE 106 may comprise a Tx UE. Also, in some instances, the first UE 104 may be configured as a TX UE as well as Rx UE. Further, in some instances, the second UE 106 may be configured as a TX UE as well as Rx UE. In some embodiments, the Tx UE 104 may support unicast, group cast or broadcast transmissions. Therefore, in some embodiments, the first UE 104 may be configured to transmit the TB to a plurality of Rx UEs (not shown here for ease of reference). In order to enable successful reception of the TB at the Rx UE 106, in some embodiments, the Tx UE 104 is configured to support retransmissions of the TB. In some embodiments, the retransmissions may comprise blind retransmissions where the Tx UE 104 is configured to transmit the TB for a (pre)configured maximum number of retransmissions, Tmax. In some embodiments, the (pre)configured maximum number of retransmissions Tmax comprises a maximum number of times a TB can be transmitted (including retransmissions). In some embodiments, the term (pre)configured refers to both configured and pre-configured. Alternately, in other embodiments, the retransmissions may comprise hybrid automatic repeat request (HARQ) based retransmissions, where the Tx UE 104 is configured to retransmit the TB when a negative acknowledgement (NACK) is received from another UE (e.g., the Rx UE 106) over the sidelink 108, until the (pre)configured maximum number of retransmissions, Tmax is reached.

Prior to transmitting the TB, in some embodiments, the Tx UE 104 is configured to determine one or more resources to be utilized for the transmission or retransmission of the TB over the sidelink 108. The embodiments described throughout the disclosure disclose UE autonomous selection where the Tx UE 104 is configured to choose/determine the one or more resources to be utilized for the transmission or retransmission of the TB over the sidelink 108, without any signaling from the gNodeB 102 (e.g., in the scenarios where the Tx UE 104 is out-of-coverage from the gNodeB 102). In order to facilitate re-transmissions over the sidelink, in some embodiments, the NR V2X supports reserving up to Nmax resources (identified as $N_{max\text{-}ind}$ in some embodiments) before each transmission of a TB. In some embodiments, Nmax comprises a maximum number of resources reserved before each transmission of the TB. In some embodiments, Nmax=3. However, Nmax may be different in other embodiments. In some embodiments, the Tx UE 104 is configured to determine the one or more resources to be utilized for the transmission of the TB from one or more resource selection windows. In some embodiments, the Tx UE 104 is configured to determine the one or more resources from within a candidate resource set associated with the respective resource selection windows. In some embodiments, the candidate resource set comprises a set of candidate resources that may be utilized by the Tx UE 104 for the transmission of the TB. In some embodiments, the resource selection window comprises a plurality of slots in time domain. Further, the one or more resources comprise time frequency resources. For example, in some embodiments, a resource for the transmission of a TB may comprise one slot in time domain and one or more subchannels in frequency domain, each subchannel comprising one or more resource blocks.

Prior to determining the one or more resources from the resource selection window, in some embodiments, the Tx UE 104 is further configured to determine the candidate resource set comprising the set of candidate resources within the resource selection window. In some embodiments, the candidate resource set is determined at the Tx UE 104 based on information received during a sensing window that precedes the resource selection window. In some embodiments, during the sensing window, the Tx UE 104 is configured to decode a sidelink control information (SCI) received from one or more other UEs, in order to determine information about one or more resources within the resource selection window that is reserved by the one or more other UEs. Further, in some embodiments, the Tx UE 104 is configured to perform sidelink reference signal receive power (SL-RSRP) measurement, in order to determine how strong signals from one or more other UEs are at the one or more reserved resources within the resource selection window. In some embodiments, the information obtained during the sensing window is utilized by the Tx UE 104, to identify the candidate resource set within the resource selection window. In some embodiments, a time period associated with the sensing window is defined in a way that a resource selection/re-selection processing time is assured before the resource selection window begins.

Figure 2:
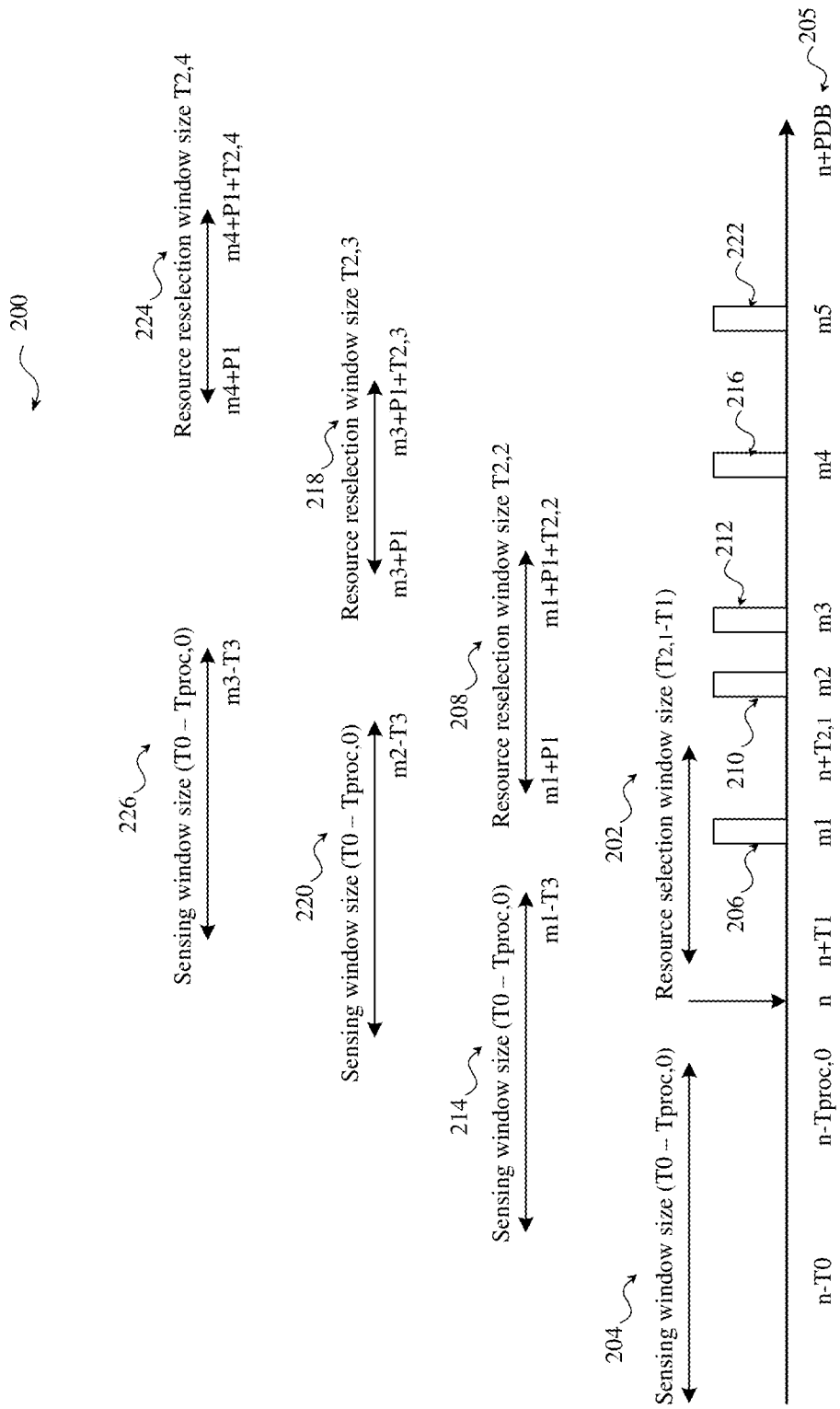
FIG. 2 depicts a resource selection procedure where up to Nmax resources associated with a first transmission of the TB is chosen in multiple resource selection windows, according to one embodiment of the disclosure.

In some embodiments, as indicated above, the Tx UE 104 is configured to determine up to Nmax resources before each transmission/re-transmission of the TB. In some embodiments, the Tx UE 104 may be configured to determine the Nmax resources associated with a transmission of the TB, using one or more resource selection windows. FIG. 2 depicts a resource selection procedure 200 where up to Nmax resources associated with a first transmission of the TB is chosen in multiple resource selection windows, according to one embodiment of the disclosure. In some embodiments, the resource selection procedure may be implemented in the Tx UE 104 of FIG. 1, in order to determine one or more resources to be utilized for transmission/re-transmission of a transport block (TB) associated with the Tx UE 104 to one or more other UEs, for example, the Rx UE 106. Therefore, the resource selection procedure 200 is explained with reference to the NR system 100 in FIG. 1.

Referring to FIG. 2, when it is determined at a slot n that a Tx UE, for example, the Tx UE 104 in FIG. 1 has a TB to transmit, the Tx UE 104 is configured to determine a first resource selection window 202 comprising a plurality of resources, in order to determine a first resource to be utilized for a first transmission of the TB over the sidelink 108. In some embodiments, the first resource selection window 202 is configured to start at a time n+T1, where T1 is any predefined number, such that the first resource selection window 202 starts within a predefined time after the time n. In some embodiments, T1 is less than or equal to Tproc,1, where Tproc,1 comprises a resource selection processing time. In some embodiments, a size of the first resource selection window 202 is derived based on a (pre)configured maximum number of retransmissions of the TB, Tmax. For example, a smaller resource selection window size is configured for a larger number of retransmissions and vice versa. In some embodiments, the size of the first resource selection window 202 is derived by further taking into consideration that a packet delay budget (PDB) associated with the TB is not exceeded. In other words, the size of the first resource selection window 202 is chosen to be within n+PDB 205. In some embodiments, the PDB comprises a maximum time a TB can remain active. Therefore, in some embodiments, T2,1 satisfies the relation, T2,min<=T2,1<=PDB. In some embodiments, the size of the first resource selection window 202 refers to a window duration in time domain. In some embodiments, the (pre)configured maximum number of retransmissions of the TB is known to the Tx UE 104. For example, in some embodiments, the (pre)configured maximum number of retransmissions of the TB is indicated to the Tx UE 104 by higher layer signaling.

Upon determining the first resource selection window 202, the Tx UE 104 is further configured to determine the first resource 206 at slot m1 within the first resource selection window 202. In some embodiments, the Tx UE 104 is configured to determine the first resource 206 from a candidate resource set comprising a set of candidate resources within the first resource selection window 202. In some embodiments, the Tx UE 104 is configured to determine the first resource 206 from the candidate resource set within the first resource selection window 202 by randomly choosing one resource from the candidate resource set. In some embodiments, the Tx UE 104 is configured to determine the candidate resource set, based on information received from one or more other UEs, during a sensing window 204 that precedes the first resource selection window 202, as explained above. In some embodiments, a window duration associated with the sensing window T0-Tproc,0 is predefined. In some embodiments, Tproc,0 comprises a UE processing time of SCI decoding and sidelink measurement. Further, the sensing window 204 is configured to end at a predefined time before time n (i.e., at time n-Tproc,0), such that there is enough processing time to determine candidate resource set within the first resource selection window 202.

Upon determining the first resource 206 at slot m1, the Tx UE 104 is further configured to determine up to Nmax−1 reserved resources for the TB, prior to a first transmission of the TB. In some embodiments, Nmax comprises a maximum number of resources reserved before each transmission of the TB, as explained above with respect to FIG. 1. In this embodiment, Nmax=3. However, Nmax may be different in different embodiments. In some embodiments, for example, when the (pre)configured maximum number of retransmissions for the TB is less than Nmax or when the PDB associated with the TB is reached before the Nmax resources are selected, then the Tx UE 104 may be configured to determine less than Nmax−1 reserved resources, prior to the first transmission of the TB. Otherwise, the Tx UE 104 is configured to choose Nmax−1 reserved resources before the first transmission of the TB.

In order to determine the Nmax−1 reserved resources, the Tx UE 104 is further configured to determine a first resource reselection window 208 that is configured to start after the slot m1 associated with the first selected resource 206. In particular, in some embodiments, the first resource reselection window 208 is configured to start at m+P1 slots, where m is a slot of the last selected resource (m=m1 in this embodiment) and a number of slots in P1 is chosen based on whether hybrid automatic repeat request (HARQ) feedback is enabled or not. In some embodiments, P1 is equal to 1, when HARQ feedback is disabled. Alternately, in other embodiments, P1 is derived based on one or more of a HARQ feedback time, a physical sidelink feedback channel (PSFCH) periodicity and a processing time associated with a physical sidelink control channel (PSCCH) or a physical sidelink shared channel (PSSCH), when HARQ feedback is enabled.

In some embodiments, a window duration of the first resource reselection window 208 is chosen in a way that a packet delay budget (PDB) associated with the TB is not exceeded. In other words, the window duration of the first resource reselection window 208 is within n+PDB 205. In some embodiments, the PDB comprises a maximum time a TB can remain active. In addition, the window duration of the first resource reselection window 208 is chosen in a way that a predefined resource reservation window size W is not exceeded from the slot the first resource 206 is chosen. In some embodiments, the resource reservation window comprises a window that starts from a resource selected for the transmission of a TB and comprises a predefined number of slots within which all the Nmax resources for the TB is to be chosen. Therefore, in this embodiment, P1+$T_{2,2}$ is less than W−1. In some embodiments, W comprises 32 slots. However, W may be defined differently in other embodiments.

Upon determining the first resource reselection window 208, the Tx UE 104 is configured to choose the Nmax−1 reserved resources within the first resource reselection window 208. Since Nmax=3 in this embodiment, the Tx UE 104 is configured to choose 2 reserved resources 210 and 212 from the first resource reselection window 208. In some embodiments, the Tx UE 104 is configured to choose the 2 reserved resources 210 and 212 randomly from a candidate resource set comprising a plurality of candidate resources within the first resource reselection window 208. In some embodiments, the Tx UE 104 is configured to determine the candidate resource set, based on information received from one or more other UEs, during a sensing window 214 that precedes the first resource reselection window 208, as explained above. In some embodiments, a window duration associated with the sensing window 214, $T_0$-Tproc,0 is predefined. Further, the sensing window 214 is configured to end at a predefined time T3 before slot m1 (i.e., at time m1-T3), such that there is enough processing time to determine candidate resource set within the first resource reselection window 208. In general, the sensing window for re-transmissions is configured to end at a predefined time T3 before the resource chosen for a current re-transmission of the TB. In some embodiments, T3 comprises a resource re-selection processing time. Although, in this embodiment, the 2 reserved resources 210 and 212 are chosen within a single resource reselection window, in other embodiments, the 2 reserved resources 210 and 212 may be chosen using 2 subsequent resource reselection windows.

Upon determining the Nmax reserved resources associated with the first transmission of the TB, the Tx UE 104 is configured to transmit the first transmission of the TB using the first resource 206 selected at the slot m1. In some embodiments, the Tx UE 104 is configured to generate a first transmission signal 110 comprising the first transmission of the TB, to be transmitted over the sidelink 108 using the selected first resource m1. Once the first transmission of the TB is completed, the Tx UE 104 is further configured to perform one or more retransmissions of the TB, based on the (pre)configured maximum number of retransmissions, Tmax defined for the TB. In some embodiments, the Tx UE 104 is configured to perform the retransmission of the TB using a reserved resource, for example the reserved resource 210 associated with the previous transmission of the TB. Prior to each subsequent retransmission of the TB, the Tx UE 104 is further configured to select one resource from a corresponding subsequent resource reselection window, in order to reserve up to Nmax reserved resources before the corresponding retransmission. In some embodiments, the Tx UE 104 is configured to select the one resource from a corresponding subsequent resource reselection window, prior to each subsequent transmission, until a total number of resources selected (including the resources on which the TB is transmitted and the reserved resources) for the transmission of the TB reaches the (pre)configured maximum number of retransmissions Tmax, or until a packet delay budget (PDB) associated with the TB is reached.

In order to perform the retransmission of the TB using the reserved resource 210, therefore, the Tx UE 104 is configured to select one resource 216 at slot m4, so that Nmax resources (i.e., 3 resources 210, 212 and 216) are reserved before the retransmission of the TB using the reserved resource 210. Prior to selecting the one resource 216, the Tx UE 104 is further configured to determine a second resource reselection window 218, in order to determine the resource 216. In some embodiments, the second resource reselection window 218 is configured to start at m+P1 slots, where m is a slot of the last selected resource (m=m3 in this embodiment) and a number of slots in P1 is chosen based on whether hybrid automatic repeat request (HARQ) feedback is enabled or not, as explained above. Further, a duration of the second resource selection window 208 is chosen in a way that a PDB associated with the TB is not exceeded and the predefined resource reservation window size W is not exceeded, as explained above.

In some embodiments, the Tx UE 104 is configured to choose the reserved resource 216 from a candidate resource set comprising a plurality of candidate resources within the second resource reselection window 218. In some embodiments, the Tx UE 104 is configured to determine the candidate resource set, based on information received from one or more other UEs, during a sensing window 220 that precedes the second resource reselection window 218, as explained above. In some embodiments, a window duration associated with the sensing window 220, $T_0$-Tproc,0 is predefined. Further, the sensing window 220 is configured to end at a predefined time T3 before slot m2 (i.e., at time m2-T3), such that there is enough processing time to determine candidate resource set within the second resource reselection window 218. Upon determining the Nmax resources associated with the first re-transmission of the TB, the Tx UE 104 is configured to transmit the first retransmission of the TB using the resource 210 selected at the slot m2. In some embodiments, the above resource reselection procedure where a subsequent resource is reserved before each subsequent re-transmission, is configured to repeat, until a total number of resources selected for the transmission of the TB reaches the (pre)configured maximum number of retransmissions, or until a packet delay budget (PDB) associated with the TB is reached.

For example, after the first retransmission of the TB using the resource 210 selected at the slot m2, the Tx UE 104 is further configured to perform a second retransmission (i.e., a subsequent retransmission) of the TB using the reserved resource 212. Prior to performing the second retransmission of the TB using the resource 212, the Tx UE 104 is configured to reserve the resource 222 during the resource reselection window 224. In some embodiments, the resource 222 is chosen within the resource reselection window 224 based on sensing information associated with one or more other UEs within the sensing window 226. Upon determining the resource 222 associated with the subsequent re-transmission of the TB, the Tx UE 104 is configured to transmit the second retransmission of the TB using the resource 212 selected at the slot m3. As can be seen in FIG. 2, after the selection of the resource 222 in the resource reselection window 224, a PDB associated with the TB is reached at n+PDB 205. Therefore, further reselection of resources for the TB is stopped, after the resource 222 is selected. Accordingly, for subsequent retransmissions of the TB using the resources 216 at slot m4 and using the resource 222 at slot m5, no further resources are reserved. In general, in some embodiments, the reselection of the subsequent resources is triggered at the Tx UE 104 when a number of resources selected before a transmission of a TB is below Nmax and the (pre)configured maximum number of retransmissions is not reached. Alternately, in some embodiments, the reselection of the subsequent resources is triggered at the Tx UE 104 when NACK is received on PSFCH and the (pre)configured maximum number of retransmissions is not reached with the existing selected resources.

Figure 3:
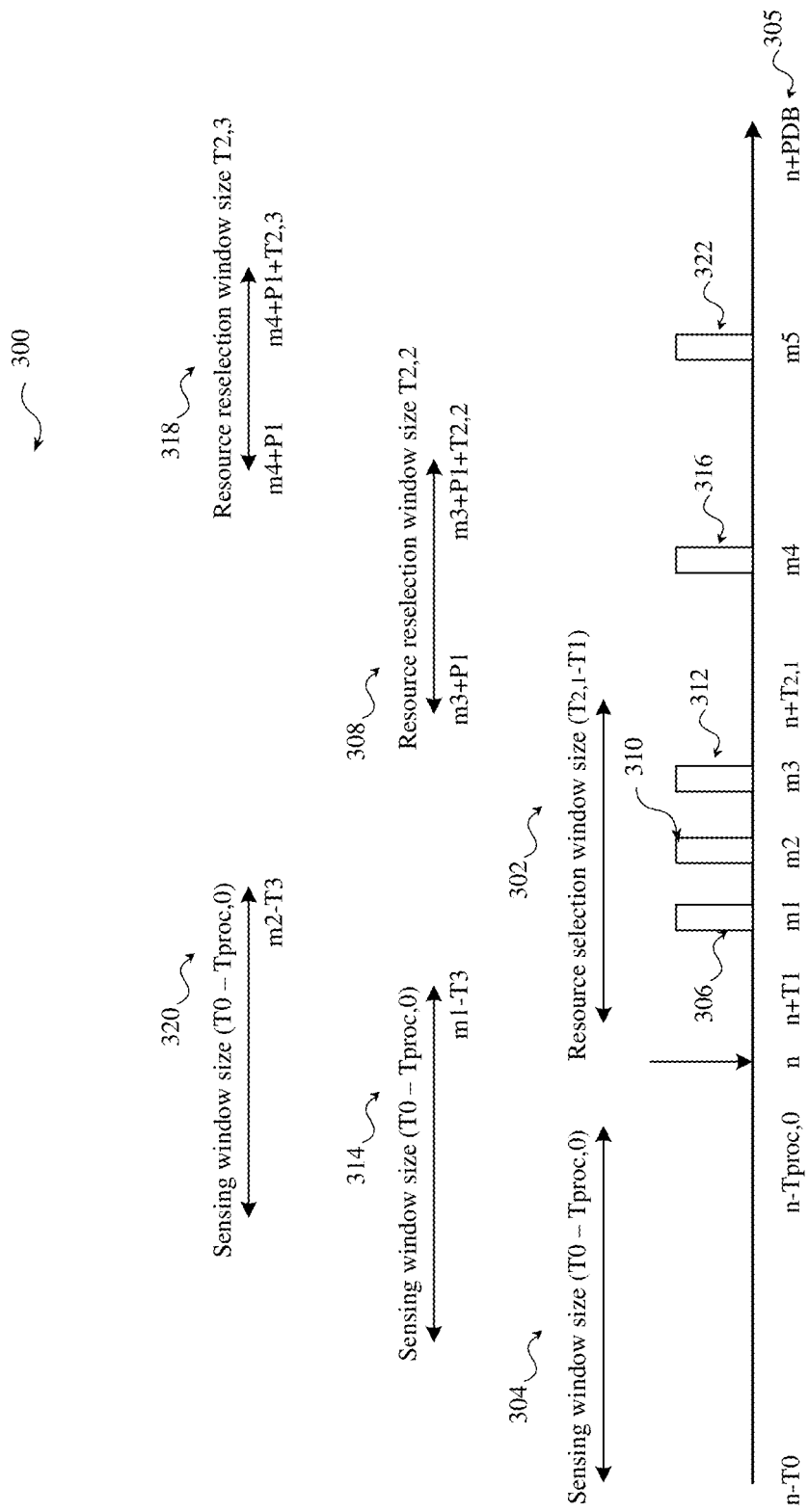
FIG. 3 depicts another embodiment of a resource selection procedure where up to Nmax resources associated with a first transmission of the TB is chosen in a single resource selection window, according to one embodiment of the disclosure.

FIG. 3 depicts another embodiment of a resource selection procedure 300 where up to Nmax resources associated with a first transmission of the TB is chosen in a single resource selection window, according to one embodiment of the disclosure. In some embodiments, the resource selection procedure 300 may be implemented in the Tx UE 104 of FIG. 1, in order to determine one or more resources to be utilized for transmission/re-transmission of a transport block (TB) associated with the Tx UE 104 to one or more other UEs, for example, the Rx UE 106. Therefore, the resource selection procedure 300 is explained with reference to the NR system 100 in FIG. 1. When it is determined at a slot n that the Tx UE 104 has a TB to transmit, the Tx UE 104 is configured to determine a first resource selection window 302 comprising a plurality of resources, in order to determine a first resource to be utilized for a first transmission of the TB over the sidelink 108. In some embodiments, the first resource selection window 302 is configured to start at a time n+T1, where T1 is any predefined number, such that the first resource selection window 302 starts within a predefined time after the time n.

In some embodiments, a size of the first resource selection window 302 is derived based on a (pre)configured maximum number of retransmissions of the TB, Tmax. For example, a smaller window size is configured for a larger number of retransmissions and vice versa. In some embodiments, the size of the first resource selection window 302 is derived by further taking into consideration that a packet delay budget (PDB) associated with the TB is not exceeded. In other words, the size of the first resource selection window 302 is chosen to be within n+PDB 305. In some embodiments, the PDB comprises a maximum time a TB can remain active. In some embodiments, the size of the first resource selection window 302 refers to a window duration in time domain. In some embodiments, the (pre)configured maximum number of retransmissions of the TB is known to the Tx UE 104. For example, in some embodiments, the (pre)configured maximum number of retransmissions of the TB is indicated to the Tx UE 104 by higher layer signaling.

Upon determining the first resource selection window 302, the Tx UE 104 is further configured to determine the first resource 306 at slot m1 within the first resource selection window 302. In some embodiments, the Tx UE 104 is configured to determine the first resource 306 from a candidate resource set comprising a set of candidate resources within the first resource selection window 302. In some embodiments, the Tx UE 104 is configured to determine the candidate resource set, based on information received from one or more other UEs, during a sensing window 304 that precedes the first resource selection window 302, as explained above. In some embodiments, a window duration associated with the sensing window 304, $T_0$-Tproc,0 is predefined. Further, the sensing window 304 is configured to end at a predefined time before time n (i.e., at time n-Tproc, 0), such that there is enough processing time to determine the candidate resource set within the first resource selection window 302.

Upon determining the first resource 306 at slot m1, the Tx UE 104 is further configured to determine up to Nmax−1 reserved resources for the TB, prior to a first transmission of the TB. In some embodiments, Nmax comprises a maximum number of resources reserved before each transmission of the TB, as explained above with respect to FIG. 1. In this embodiment, Nmax=3. However, Nmax may be different in different embodiments. In some embodiments, for example, when the (pre)configured maximum number of retransmissions for the TB is less than Nmax or when the PDB associated with the TB is reached before the Nmax resources are selected, then the Tx UE 104 may be configured to determine less than Nmax−1 reserved resources, prior to the first transmission of the TB. Otherwise, the Tx UE 104 is configured to choose Nmax−1 reserved resources before the first transmission of the TB.

In some embodiments, the Tx UE 104 is configured to determine the Nmax−1 reserved resources within the first resource selection window 302. In such embodiments, the Nmax−1 reserved resources are also determined from the candidate resource set within the first resource selection window 302. Since Nmax=3 in this embodiment, the Tx UE 104 is configured to choose 2 reserved resources 310 and 312 from the first resource selection window 308. In some embodiments, the Tx UE 104 is configured to choose the 2 reserved resources 310 and 312 randomly from the candidate resource set comprising the plurality of candidate resources within the first resource reselection window 308.

Upon determining the Nmax−1 reserved resources 310 and 312 associated with the first transmission of the TB, the Tx UE 104 is configured to transmit the first transmission of the TB using the first resource 306 selected at the slot m1. In some embodiments, the first transmission of the TB may be included with the first transmission signal 110 in FIG. 1. Once the first transmission of the TB is completed, the Tx UE 104 is further configured to perform one or more retransmissions of the TB, based on the (pre)configured maximum number of retransmissions, Tmax defined for the TB. In some embodiments, the Tx UE 104 is configured to perform the retransmission of the TB using a reserved resource, for example the reserved resource 310 associated with the previous transmission of the TB. Prior to each subsequent retransmission of the TB, the Tx UE 104 is further configured to select one resource from a corresponding subsequent resource reselection window, in order to reserve up to Nmax resources before the corresponding retransmission of the TB. In some embodiments, the Tx UE 104 is configured to select the one resource from the corresponding subsequent resource reselection window, prior to each subsequent transmission of the TB, until a total number of resources selected (including the resources on which the TB is transmitted and the reserved resources) for the transmission of the TB reaches the (pre)configured maximum number of retransmissions Tmax, or until a packet delay budget (PDB) associated with the TB is reached.

In order to perform the retransmission of the TB using the reserved resource 310, therefore, the Tx UE 104 is configured to select one resource 316 at slot m4, so that Nmax resources (i.e., 3 resources 310, 312 and 316) are reserved before the retransmission of the TB using the reserved resource 310. Prior to selecting the one resource 316, the Tx UE 104 is further configured to determine a first resource reselection window 308, in order to determine the resource 316. In some embodiments, the first resource reselection window 308 is configured to start at m+P1 slots, where m is a slot of the last selected resource (m=m3 in this embodiment) and a number of slots in P1 is chosen based on whether hybrid automatic repeat request (HARQ) feedback is enabled or not. In some embodiments, P1 is equal to 1, when HARQ feedback is disabled. Alternately, in other embodiments, P1 is derived based on one or more of a HARQ feedback time, a physical sidelink feedback channel (PSFCH) periodicity and a processing time associated with a physical sidelink control channel (PSCCH) or a physical sidelink shared channel (PSSCH), when HARQ feedback is enabled.

In some embodiments, a window duration of the first resource reselection window 308 is chosen in a way that a packet delay budget (PDB) associated with the TB is not exceeded. In other words, the size of the first resource selection window 202 is chosen to be within n+PDB 205. In some embodiments, the PDB comprises a maximum time a TB can remain active. In addition, the window duration of the first resource reselection window 308 is chosen in a way that a predefined resource reservation window size W is not exceeded from the slot of the resource chosen for the current transmission of the TB, that is, the resource 310, as explained above with respect to FIG. 2. In some embodiments, the resource reservation window comprises a window that starts from a resource selected for the current transmission of a TB and comprises a predefined number of slots within which all the Nmax resources for the TB is to be chosen. Therefore, in this embodiment, P1+T2,2+m3−m2 is less than W−1. In some embodiments, W comprises 32 slots. However, W may be defined differently in other embodiments.

In some embodiments, the Tx UE 104 is configured to choose the reserved resource 316 from a candidate resource set comprising a plurality of candidate resources within the first resource reselection window 308. In some embodiments, the Tx UE 104 is configured to determine the candidate resource set, based on information received from one or more other UEs, during a sensing window 314 that precedes the first resource reselection window 308, as explained above. In some embodiments, a window duration associated with the sensing window 220, $T_0$-Tproc,0 is predefined. Further, the sensing window 314 is configured to end at a predefined time T3 before slot m2 (i.e., at time m2-T3), such that there is enough processing time to determine candidate resource set within the second resource reselection window 308. In general, the sensing window for re-transmissions is configured to end at a predefined time T3, before the resource chosen for a current re-transmission of the TB. In some embodiments, T3 comprises a re-selection processing time. Upon determining the Nmax resources associated with the first re-transmission of the TB, the Tx UE 104 is configured to transmit the first retransmission of the TB using the resource 310 selected at the slot m2.

In some embodiments, the above resource reselection procedure where a subsequent resource is reserved before each subsequent re-transmission, is configured to repeat, until a total number of resources selected for the transmission of the TB reaches the (pre)configured maximum number of retransmissions, or until a packet delay budget (PDB) associated with the TB is reached. For example, after the first retransmission of the TB using the resource 310 selected at the slot m2, the Tx UE 104 is further configured to perform a second retransmission (i.e., a subsequent retransmission) of the TB using the reserved resource 312. Prior to performing the second retransmission of the TB using the resource 312, the Tx UE 104 is configured to reserve the resource 322 during the resource reselection window 318. In some embodiments, the resource 322 is chosen within the resource reselection window 318 based on sensing information associated with one or more other UEs within the sensing window 320.

Upon determining the resource 322, the Tx UE 104 is configured to transmit the second retransmission of the TB using the resource 312 selected at the slot m3. As can be seen in FIG. 3, after the selection of the resource 322 in the resource reselection window 318, a PDB associated with the TB is reached. Therefore, further reselection of resources for the TB is stopped, after the resource 322 is selected. Accordingly, for subsequent retransmissions of the TB using the resources 316 at slot m4 and using the resource 322 at slot m5, no further resources are reserved. In general, in some embodiments, the reselection of the subsequent resources is triggered at the Tx UE 104 when a number of resources selected before a transmission of a TB is below Nmax and the (pre)configured maximum number of retransmissions is not reached. Alternately, in some embodiments, the reselection of the subsequent resources is triggered at the Tx UE 104 when NACK is received on PSFCH and the (pre) configured maximum number of retransmissions is not reached with the existing selected resources.

Figure 4:
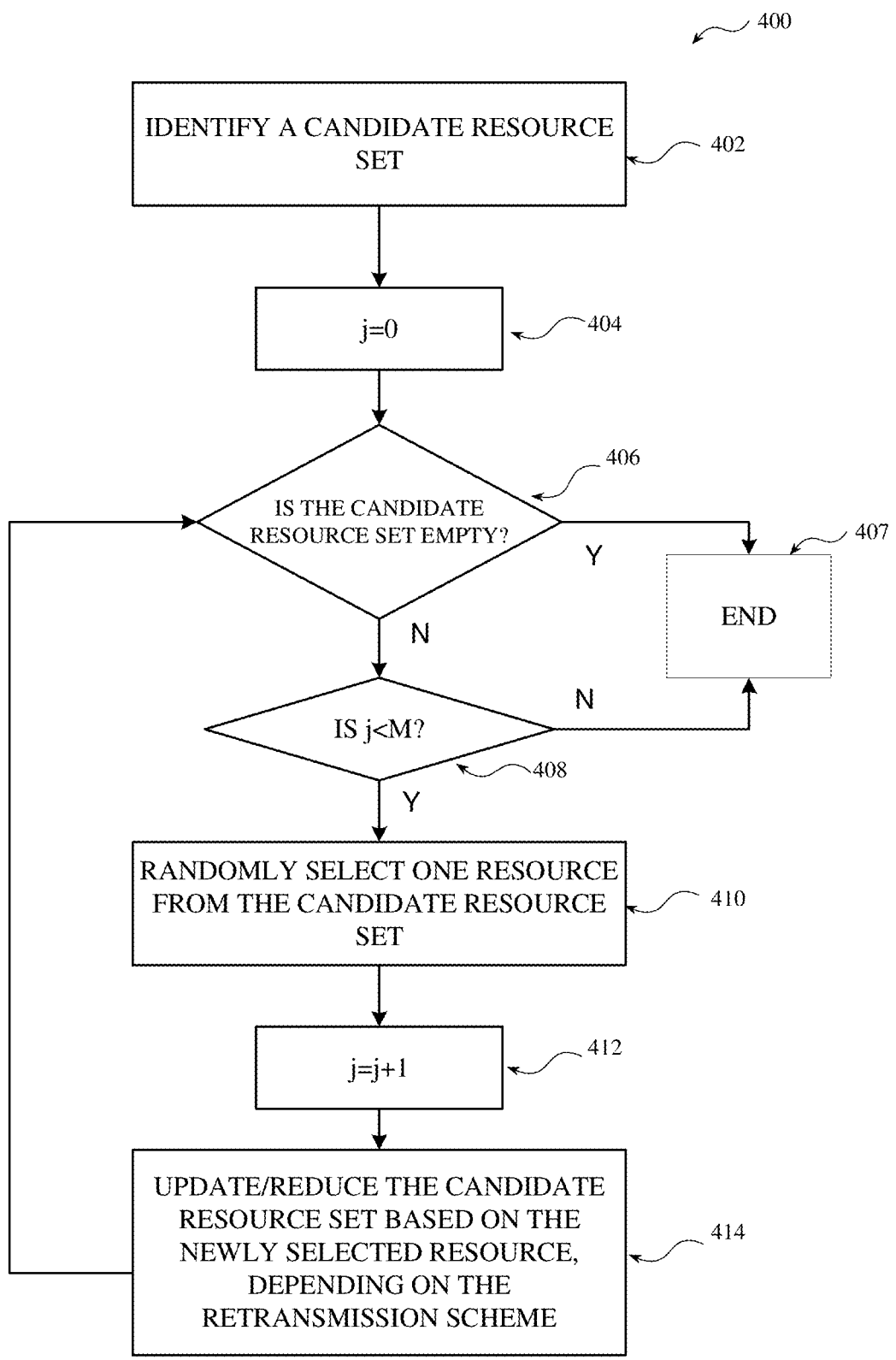
FIG. 4 illustrates a flow diagram of an algorithm to be utilized to determine multiple resources from a candidate resource set within a single resource selection/re-selection window, according to one embodiment of the disclosure.

FIG. 4 illustrates a flow diagram of an algorithm 400 to be utilized to determine multiple resources from a candidate resource set within a single resource selection/re-selection window, according to one embodiment of the disclosure. In some embodiments, the algorithm 400 may be applied to determine the resources 210 and 212 within the first resource reselection window 208 in FIG. 2 above. Further, the algorithm 400 may be applied to determine the resources 306, 310 and 312 within the first resource selection window 302 in FIG. 3 above. At 402, a candidate resource set comprising a set of candidate resources, say S candidate resources at corresponding set of time slots Ts is identified within a single resource selection/reselection window. At 404, a number of resources selected j is initialized to zero. At 406, a determination is made whether the candidate resource set is empty. If the candidate resource set is empty, the algorithm proceeds to 407, where the algorithm 400 ends. If the candidate resource set is not empty, the algorithm proceeds to 408, where a determination whether the number of resources selected j is less than M, where M is the total number of resources to be selected from the candidate resource set.

If No at 408, the algorithm 400 proceeds to 407, where the algorithm 400 ends. If yes at 408, the algorithm 400 proceeds to 410, where one resource is randomly selected from the candidate resource set. Upon selecting one resource from the candidate resource set at 410, the algorithm 400 proceeds to 412, where the number of resources selected j is incremented by 1. Then the algorithm 400 proceeds to 414, where the candidate resource set is updated/reduced, depending on the retransmission scheme. Upon updating the candidate resource set, the algorithm 400 proceeds to 406, where the algorithm 400 repeats itself to select one or more resources until the candidate resource set is empty or until the number of resources selected j is equal to or greater than M.

In some embodiments, the candidate resource set is updated/reduced after the selection of each resource from the candidate resource set, in accordance with a time slot of the newly selected resource, until the required number of resources are selected. In particular, in some embodiments, the candidate resource set is updated as the corresponding time slots T's, in accordance with the relation:

$$T's = Ts \cap [t-W, t-V] \cap [t+V, t+W] \quad (1)$$

Where t is the time slot of the newly selected resource, T's is the updated time slots of the candidate resource set, Ts is the previous time slots of the candidate resource set, W is the size of resource reservation window minus 1, and V is a number of time slots defined based on whether hybrid automatic repeat request (HARQ) feedback is enabled or not. For example, V is equal to 1, if HARQ feedback is disabled. Alternately, V is derived based on one or more of a HARQ feedback time, a physical sidelink feedback channel (PSFCH) periodicity and a processing time associated with a physical sidelink control channel (PSCCH) or a physical sidelink shared channel (PSSCH), when HARQ feedback is enabled. In some embodiments, the equation (1) updates the time slots associated with the candidate resource set in a way that already chosen resources are eliminated/excluded from the candidate resource set. Further, the equation (1) updates the time slots associated with the candidate resource set in a way that all resources with time beyond resource reservation window of the selected resource is excluded. Further, the equation (1) updates the time slots associated with the candidate resource set in a way that all resources with time between the selected resource time and its corresponding PSFCH time are excluded.

Figure 5A:
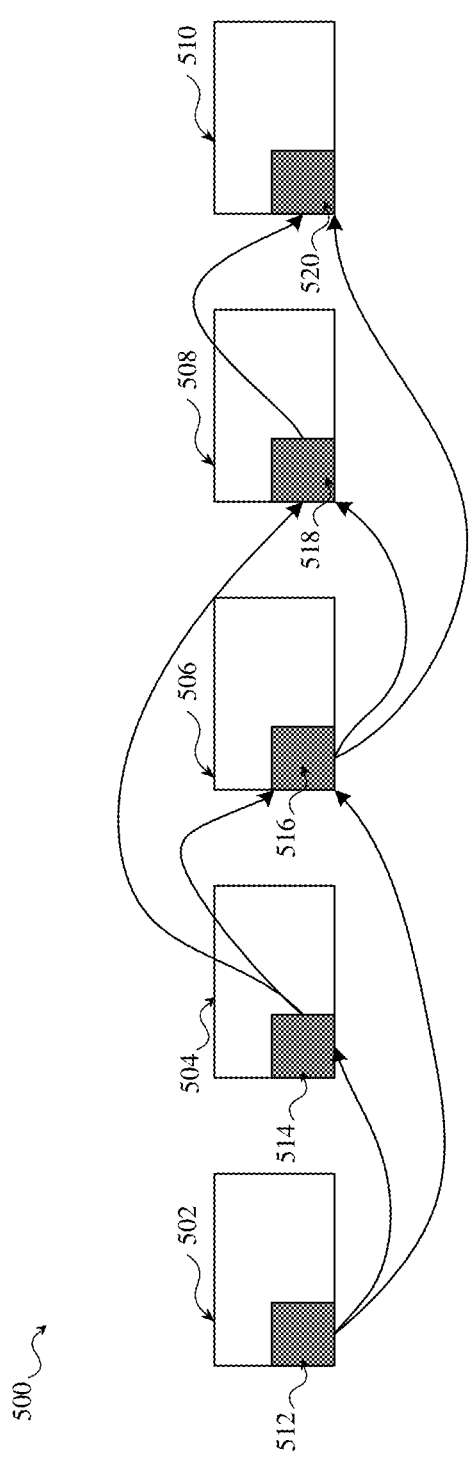
FIG. 5a illustrates a resource reservation scheme comprising a forward only booking scheme, where each transmission/retransmission of a TB includes information of up to Nmax−1 reserved resources for the TB, based on the (pre)configured maximum number of retransmissions, according to one embodiment of the disclosure.

Referring back to FIG. 2 and FIG. 3 above, it can be seen that up to Nmax resources are reserved by the Tx UE 104 before each transmission/retransmission of a TB. In some embodiments, the Tx UE 104 may be further configured to provide information on up to Nmax−1 subsequent reserved resources, during each transmission/re-transmission of a transport block (TB), as part of the sidelink control information (SCI). FIG. 5a illustrates a resource reservation scheme comprising a forward only booking scheme 500, where each transmission/retransmission of a TB includes information of up to Nmax−1 reserved resources for the TB, based on the (pre)configured maximum number of retransmissions. In some embodiments, FIG. 5A illustrates a retransmission scenario where the (pre)configured maximum number of retransmissions is 5 and Nmax is 3. In particular, FIG. 5A illustrates 5 transmissions/retransmissions of the TB 502, 504, 506, 508 and 510, and their corresponding resources 512, 514, 516, 518 and 520.

As can be seen in FIG. 5A, the first transmission 502 of the TB reserves (or includes information of) 2 resources (i.e., Nmax−1 subsequent reserved resources) 514 and 516 to be utilized for the second transmission 504 and the third transmission 506 of the TB. Further, the second transmission 504 of the TB includes information of 2 resources 516 and 518 to be utilized for the third transmission 506 and the fourth transmission 508 of the TB. The third transmission 506 of the TB includes information of 2 resources 518 and 520 to be utilized for the fourth transmission 508 and the fifth transmission 510 of the TB. However, the fourth transmission 508 of the TB includes information of only one resource 520, to be utilized for the fifth transmission 510, as the (pre)configured maximum number of retransmissions is reached by the fifth transmission 510. Similarly, the fifth transmission 510 of the TB does not include information of any resource, as the (pre)configured maximum number of retransmissions is reached by the fifth transmission 510. While using the forward only booking scheme 500, a retransmission index is not included in the SCI.

Figure 5B:
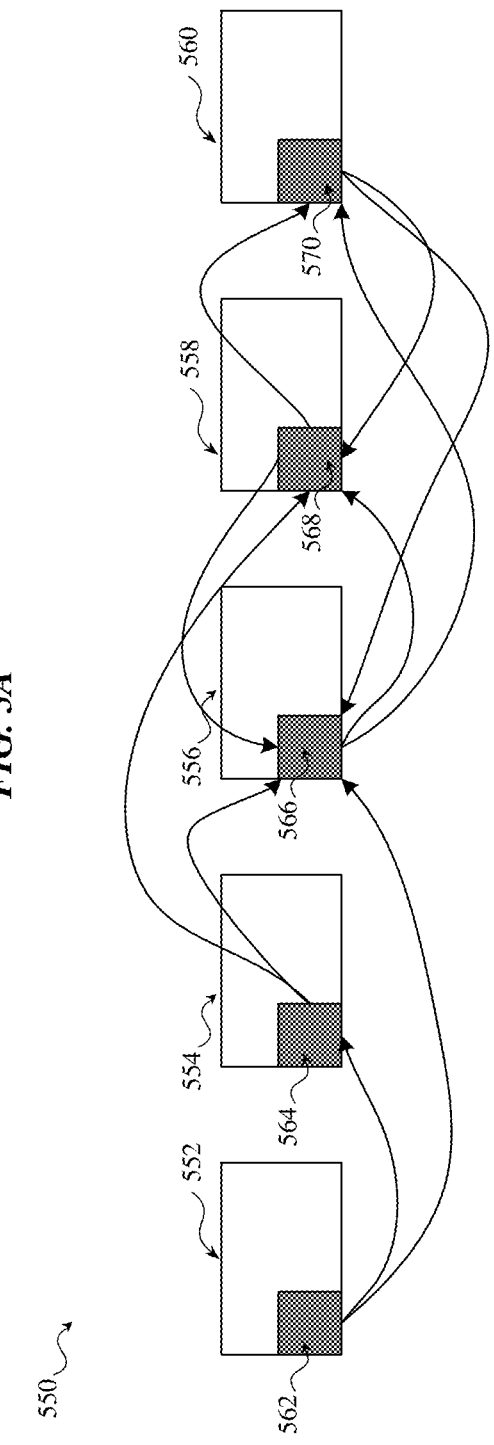
FIG. 5B illustrates an alternate resource reservation scheme comprising a forward booking plus backward pointing scheme, where each transmission/retransmission of a TB includes information of up to Nmax−1 reserved resources for the TB, based on the (pre)configured maximum number of retransmissions, according to one embodiment of the disclosure.

FIG. 5B illustrates an alternate resource reservation scheme comprising a forward booking plus backward pointing scheme 550, where each transmission/retransmission of a TB includes information of up to Nmax−1 reserved resources for the TB, based on the (pre)configured maximum number of retransmissions. In addition, one or more retransmissions of the TB further includes information on resources utilized for the transmission of one or more previous transmissions, when less than Nmax−1 resources are reserved for the subsequent retransmissions. In some embodiments, FIG. 5A illustrates a retransmission scenario where the (pre)configured maximum number of retransmissions is 5 and Nmax is 3. In particular, FIG. 5B illustrates 5 transmissions/retransmissions of the TB 552, 554, 556, 558 and 560, and their corresponding resources 562, 564, 566, 568 and 570.

As can be seen in FIG. 5B, the first transmission 552 of the TB reserves (or includes information of) 2 resources (i.e., Nmax−1 subsequent reserved resources) 564 and 566 to be utilized for the second transmission 554 and the third transmission 556 of the TB. Further, the second transmission 554 of the TB includes information of 2 resources 566 and 568 to be utilized for the third transmission 556 and the fourth transmission 558 of the TB. The third transmission 556 of the TB includes information of 2 resources 568 and 570 to be utilized for the fourth transmission 558 and the fifth transmission 560 of the TB. However, the fourth transmission 558 of the TB includes information of one resource 560, to be utilized for the fifth transmission 560 as well as points to the resource 566 of the third transmission 556. Similarly, the fifth transmission 510 of the TB points to the resources 568 and 566 of the fourth transmission 558 and the third transmission 556, respectively. While using the forward booking plus backward pointing scheme 550, a retransmission index is included in the SCI. In particular, the fifth transmission 560 has a retransmission index of 2, the fourth transmission has a retransmission index of 1 and the other transmissions has a retransmission index of 0.

Referring back to FIGS. 1-3, it is indicated that the Tx UE 104 is configured to determine the one or more resources for the transmission/retransmission of the TB from a candidate resource set associated with the respective resource selection windows. Prior to determining the one or more resources for the transmission/retransmission of the TB from the candidate resource set, therefore, in some embodiments, the Tx UE 104 is configured to determine/select the candidate resource set comprising a set of candidate resources. In particular, in some embodiments, the Tx UE 104 is configured to select a candidate resource set comprising a plurality of candidate resources from a resource selection/reselection window (e.g., the resource selection window 202 in FIG. 2) comprising a plurality of resources. In some embodiments, the candidate resource set is utilized by the Tx UE 104 for a transmission of a transport block (TB) over sidelink using a subset of candidate resources within the candidate resource set. In some embodiments, the subset of candidate resources may include one or more candidate resources.

In some embodiments, the Tx UE 104 is configured to select the candidate resource set based on pre-emption. In such embodiments, the candidate resource set comprises one or more reserved resources comprising resources that are reserved by one or more other UEs (e.g., the Rx UE 106 in FIG. 1). In some embodiments, the Tx UE 104 is configured to choose the one or more reserved resources from the resource selection window, in accordance with a data priority level of the one or more reserved resources. In some embodiments, the Tx UE 104 is configured to trigger a pre-emption procedure comprising selecting the candidate resource set comprising the one or more reserved resources, when a data priority $P_{TX}$ of the Tx UE 104 is larger than a predefined transmit threshold $Th_{TX}$ and/or when a data priority $P_{RX}$ of the other UEs is below a predefined receive threshold $Th_{RX}$ and/or when a gap between the $P_{TX}$ and the $P_{RX}$ is larger than a predefined threshold gap.

Figures 1, 6:
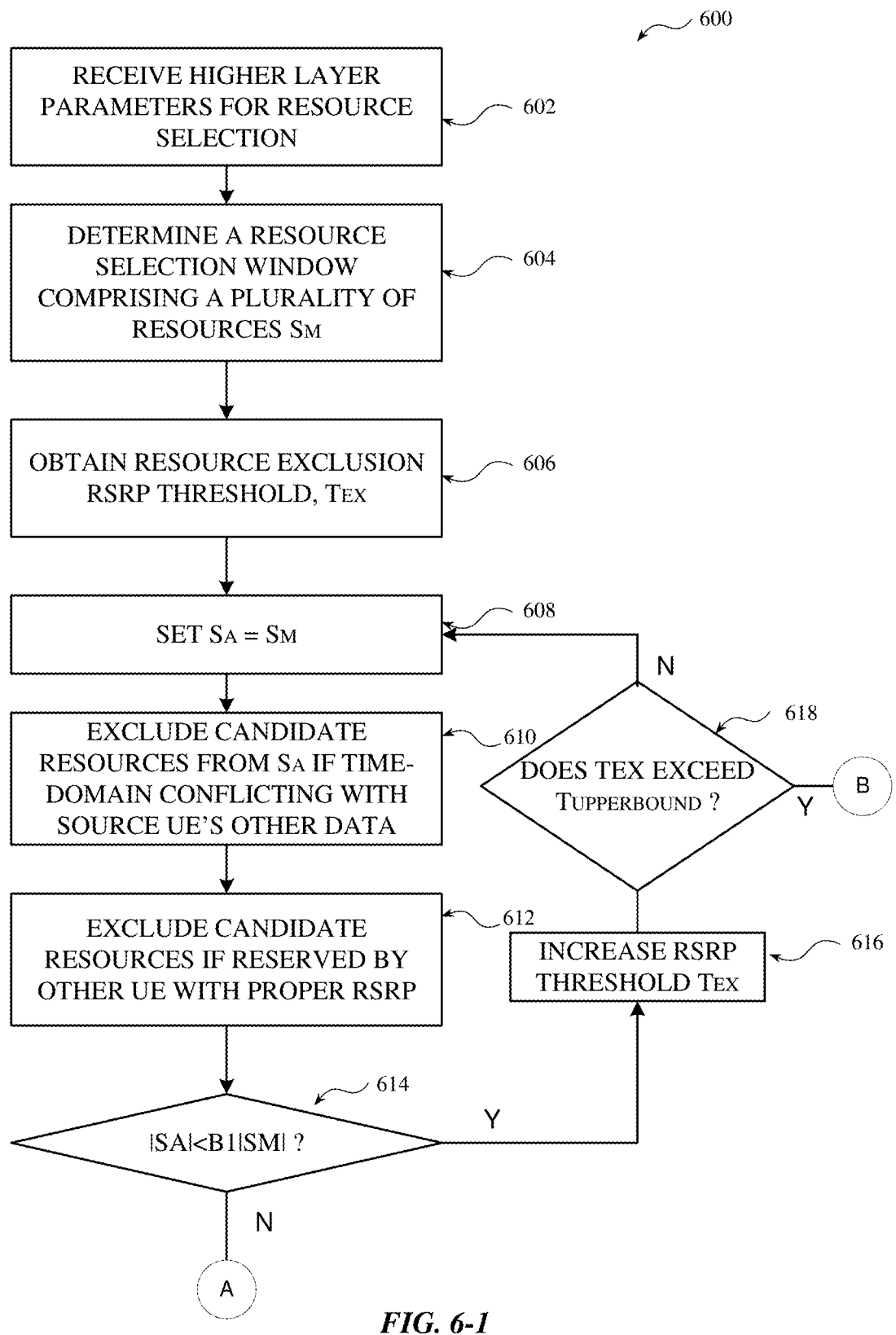
FIG. 6 depicts a flow diagram of an algorithm for determining a candidate resource set S based on pre-emption, according to one embodiment of the disclosure.
Figures 2, 6:
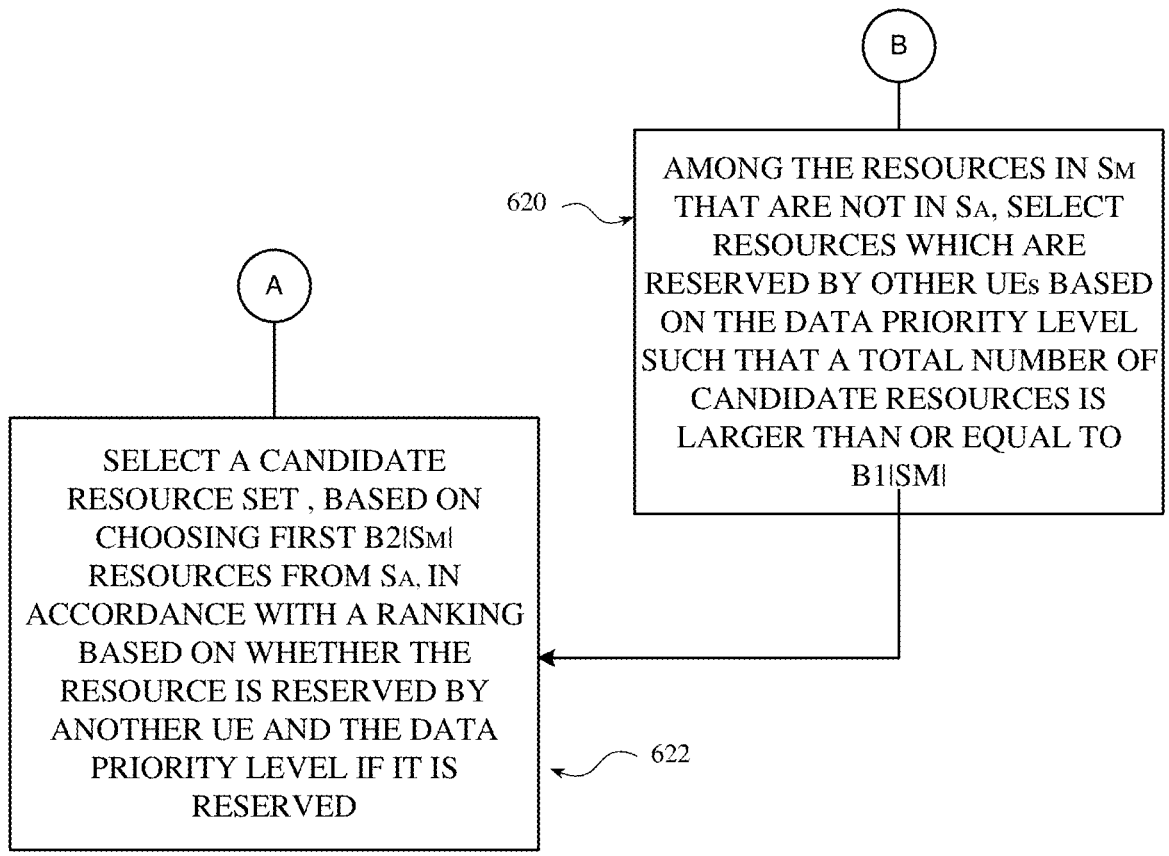

FIG. 6 depicts a flow diagram of an algorithm 600 for determining a candidate resource set S based on pre-emption, according to one embodiment of the disclosure. In some embodiments, the algorithm 600 may be implemented within the Tx UE 104 in FIG. 1. Therefore, the algorithm 600 is explained herein with reference to the NR system 100 in FIG. 1. At 602, higher layer parameters for resource selection are received at the Tx UE 104. In some embodiments, the higher layer parameters may include a predefined maximum number of retransmissions for a transport block (TB), a packet delay budget (PDB) of a TB, a resource reservation window size etc. At 604, a resource selection window (e.g., the first resource selection window 202 in FIG. 2) is determined. In some embodiments, the resource selection window comprises a plurality of resources $S_M$. At 606, a resource exclusion RSRP threshold, $T_{EX}$ is obtained at the Tx UE 104. In some embodiments, the resource exclusion RSRP threshold $T_{EX}$ is predefined and stored within the Tx UE 104 (e.g., in a memory circuit associated therewith). Alternately, the resource exclusion RSRP threshold $T_{EX}$ is obtained at the Tx UE 104 via higher layer signaling. In some embodiments, the resource exclusion RSRP threshold $T_{EX}$ is to be utilized by the Tx UE 104 to exclude resources within the resource selection window that are reserved by other UEs and having an RSRP level that is greater than the resource exclusion RSRP threshold $T_{EX}$, while choosing the candidate resource set.

At 608, a sample candidate resource set $S_A$ is initialized to be equal to the plurality of resources $S_M$. At 610, the sample candidate resource set $S_A$ is updated/reduced based on excluding resources that conflict with other data associated with the Tx UE 104 (i.e., the source UE). At 612, the sample candidate resource set $S_A$ is updated/reduced based on excluding resources that are reserved by other UEs having proper RSRP. In some embodiments, the proper RSRP corresponds to an RSRP level that is greater the resource exclusion RSRP threshold $T_{EX}$. In some embodiments, an RSRP level greater than the resource exclusion RSRP threshold $T_{EX}$ indicates that the resources are utilized by other UE's in close proximity to the Tx UE 104. In some embodiments, the RSRP of the resources is measured based on one or more reference signals associated therewith. At the end of 612, the sample candidate resource set $S_A$ comprises one or more candidate resources.

At 614, a determination is made whether a number of candidate resources in the sample candidate resource set $S_A$ (that is updated) comprises less than a predefined required candidate resource number B1|$S_M$|, where B1 is a predefined required candidate resource threshold. If No at 614, the algorithm 600 proceeds to 622, where a candidate resource set S is selected based on choosing from first B2|SM| resources from the sample candidate resource set $S_A$, in accordance with a ranking based on whether the resource is reserved by another UE and based on the data priority if reserved. In some embodiments, B2 comprises a predefined maximum candidate resource threshold (typically 20%). If yes at 614, the algorithm proceeds to 616, where the resource exclusion RSRP threshold $T_{EX}$ is increased. Then the algorithm 600 proceeds to 618, where a determination is made whether the resource exclusion RSRP threshold $T_{EX}$ exceeds a predefined upper bound exclusion threshold $T_{upperbound}$. If No at 618, the algorithm proceeds to 608, where the selection of the sample candidate resource set $S_A$ is repeated based on the increased resource exclusion RSRP threshold $T_{EX}$. In some embodiments, increasing the predefined resource exclusion RSRP threshold $T_{EX}$ by a predefined amount (e.g., 3 dB). In some embodiments, upper bound exclusion threshold $T_{upperbound}$ is predefined. In some embodiments, separate sets of the resource exclusion RSRP threshold $T_{EX}$ and the upper bound exclusion threshold $T_{upperbound}$ are defined for different data priority pairs $P_{TX}$ and $P_{RX}$, where $P_{TX}$ comprises a data priority associated with the Tx UE (e.g., the Tx UE 104) and $P_{RX}$ comprises a data priority associated with a pre-empted UE (e.g., the Rx UE 106 in FIG. 1).

If yes at 618, the algorithm 600 proceeds to 620, where one or more sets of reserved resources in $S_M$ that are not in $S_A$, which are reserved by other UEs are selected by the Tx UE 104 to be part of the $S_A$ so that a number of candidate resources in the sample candidate resource set $S_A$ is greater than or equal to the predefined required candidate resource number $B1|S_M|$. In some embodiments, a set of reserved resources comprises one or more reserved resources. In some embodiments, the reserved resources in $S_M$ that are not in $S_A$, which are reserved by other UEs have an RSRP level greater than the predefined upper bound exclusion threshold $T_{upperbound}$. In some embodiments, the one or more sets of reserved resources in $S_M$ that are not in $S_A$, which are reserved by other UEs are chosen based on a data priority $P_{RX}$ of the resources associated with the one or more sets of reserved resources and/or an RSRP level of the resources associated with the one or more sets of reserved resources. In some embodiments, the one or more sets of reserved resources are chosen based on choosing a set of reserved resources within the resource selection window with lowest data priority level, and repeatedly choosing subsequent sets of reserved resources within the resource selection window by increasing the data priority level, until the number of candidate resources chosen from the resource selection window (in other words, the number of candidate resources in the sample candidate resource set $S_A$), in order to form the candidate resource set S, is greater than the predefined required candidate resource number $B1|S_M|$. Therefore, in some embodiments, the sets of reserved resources associated with the one or more sets of reserved resources comprise different data priority levels. Further, in some embodiments, choosing the set of reserved resources for each data priority level comprises choosing a group of reserved resources having RSRP level below a predefined RSRP threshold and repeatedly choosing subsequent groups of reserved resources by increasing the RSRP threshold, until a predefined maximum RSRP threshold is reached.

In particular, in one example embodiment, choosing the one or more sets of reserved resources from $S_M$ comprises choosing a set of resources (e.g., all the resources) with reservation for lowest data priority $P_{RX}$ at first, and if the number of candidate resources chosen from the resource selection window (i.e., the number of candidate resources in the sample candidate resource set $S_A$) is less than the predefined required candidate resource number $B1|S_M|$, choosing subsequent set of resources with reservation by incrementing the data priority (for example, a set of resources with reservation for second lowest priority, third lowest priority etc.), until the number of candidate resources in the sample candidate resource set $S_A$ is greater than the predefined required candidate resource number $B1|S_M|$.

Alternately, in another example embodiment, choosing the one or more sets of reserved resources comprises choosing a set of resources (or all the resources) with reservation for lowest data priority $P_{RX}$ and having an RSRP level below a predefined RSRP threshold R1 at first, and if the number of candidate resources chosen from the resource selection window (i.e., the number of candidate resources in the sample candidate resource set $S_A$) is less than the predefined required candidate resource number $B1|S_M|$, choosing subsequent set of resources with reservation for lowest data priority by incrementing the RSRP threshold R1, until the highest RSRP threshold Rmax is reached or until the number of candidate resources in the sample candidate resource set $S_A$ is greater than the predefined required candidate resource number $B1|S_M|$. If the number of candidate resources chosen from the resource selection window is less than the predefined required candidate resource number $B1|S_M|$ even after the highest RSRP threshold Rmax is reached, the above procedure is repeated by repeatedly incrementing the data priority, until the number of candidate resources in the sample candidate resource set $S_A$ is greater than or equal to the predefined required candidate resource number $B1|S_M|$.

When the number of candidate resources in the sample candidate resource set $S_A$ is greater than or equal to the predefined required candidate resource number $B1|S_M|$, the algorithm proceeds to 622, where the candidate resource set S is selected by the Tx UE 104 based on choosing first $B2|S_M|$ resources from the sample candidate resource set $S_A$. Therefore, in some embodiments, the candidate resource set S comprises one or more reserved resources having an RSRP level greater than the predefined upper bound exclusion threshold $T_{upperbound}$. In some embodiments, the one or more reserved resources within the candidate resource set S comprises a subset of the one or more sets of reserved resources having an RSRP level greater than the predefined upper bound exclusion threshold $T_{upperbound}$ within the sample candidate resource set $S_A$. In some embodiments, the first $B2|S_M|$ resources are chosen from the sample candidate resource set $S_A$, in accordance with a ranking based on whether the resource is reserved by another UE and based on the data priority $P_{RX}$ of the resource, if the resource is reserved. In particular, in some embodiments, the Tx UE 104 is configured to rank all the resources in the sample candidate resource set $S_A$ based on whether the resource is reserved by another UE and based on the data priority $P_{RX}$ if reserved.

For example, all the resources in the sample candidate resource set $S_A$ without reservation by other UEs have rank 1, all the resources in the sample candidate resource set $S_A$ with reservation for the lowest priority $P_{RX}$ have rank 2, all the resources in the sample candidate resource set $S_A$ with reservation for the second lowest priority $P_{RX}$ have rank 3, etc. In some embodiments, the Tx UE 104 is configured to select the candidate resource set S based on choosing a set of resources (e.g., all the resources) in the sample candidate resource set $S_A$ having rank 1 and if the number of candidate resources within the candidate resource set S is less than $B2|S_M|$, repeatedly choosing one or more sets of resources in the sample candidate resource set $S_A$ having rank 2, rank 3 etc., until the number of candidate resources within the candidate resource set S is equal to or greater than $B2|S_M|$. If the number of candidate resources within the candidate resource set S becomes greater than $B2|S_M|$, then one or more resources in the current rank are randomly selected/eliminated from the candidate resource set S, so that the number of candidate resources within the candidate resource set S becomes equal to $B2|S_M|$.

Figures 1, 7:
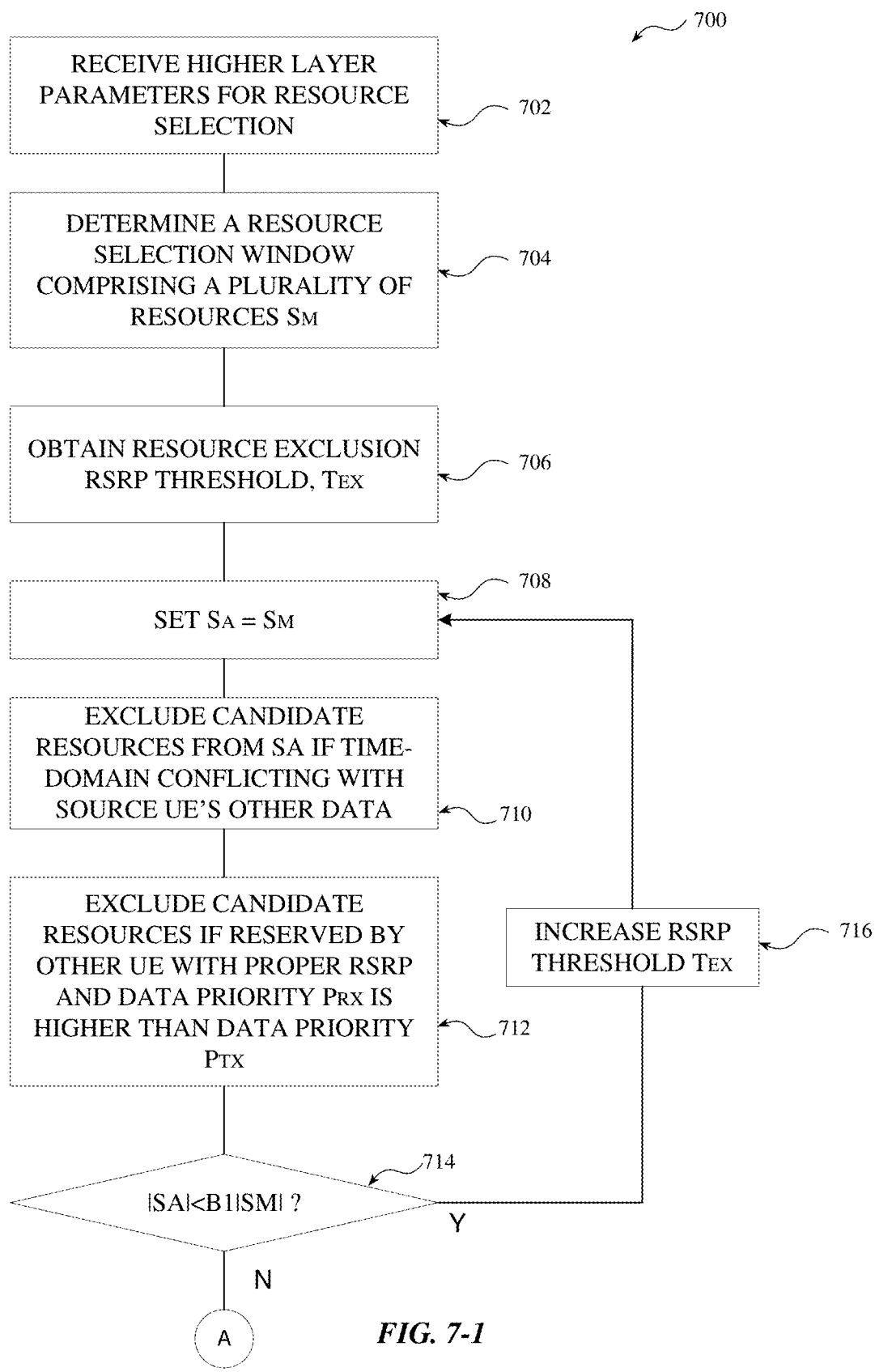
FIG. 7 depicts a flow diagram of an algorithm for determining a candidate resource set S based on pre-emption, according to another embodiment of the disclosure.
Figures 2, 7:
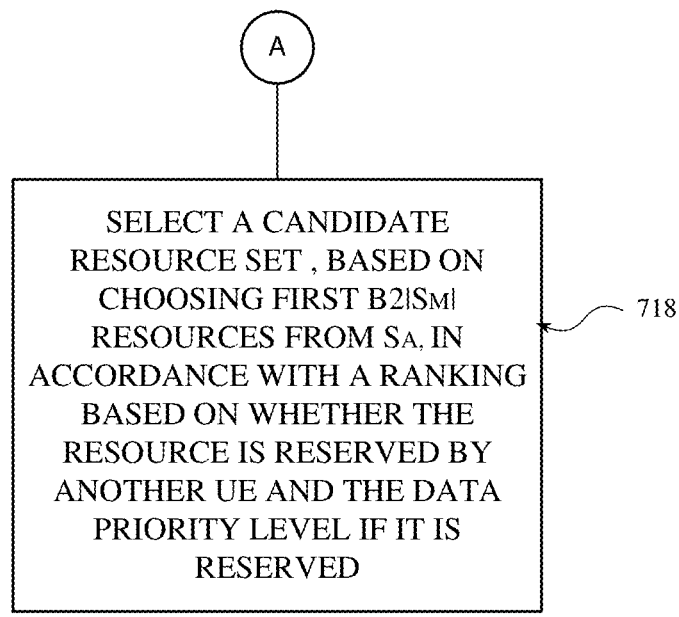

FIG. 7 depicts a flow diagram of an algorithm 700 for determining a candidate resource set S based on pre-emption, according to another embodiment of the disclosure. In some embodiments, the algorithm 700 may be implemented within the Tx UE 104 in FIG. 1. Therefore, the algorithm 700 is explained herein with reference to the NR system 100 in FIG. 1. At 702, higher layer parameters for resource selection are received at the Tx UE 104. In some embodiments, the higher layer parameters may include a predefined maximum number of retransmissions for a transport block (TB), a packet delay budget (PDB) of a TB, a resource reservation window size etc. At 704, a resource selection/reselection window (e.g., the first resource selection window 202 in FIG. 2) is determined. In some embodiments, the resource selection window comprises a plurality of resources $S_M$. At 706, a resource exclusion RSRP threshold, $T_{EX}$ is obtained at the Tx UE 104. In some embodiments, the resource exclusion RSRP threshold $T_{EX}$ is predefined and stored within the Tx UE 104 (e.g., in a memory circuit associated therewith). In some embodiments, the resource exclusion RSRP threshold $T_{EX}$ is obtained at the Tx UE 104 via higher layer signaling. In some embodiments, the resource exclusion RSRP threshold $T_{EX}$ is to be utilized by the Tx UE 104 to exclude resources within the resource selection window that are reserved by other UEs and having an RSRP level that is greater than the resource exclusion RSRP threshold $T_{EX}$, while choosing the candidate resource set.

At 708, a sample candidate resource set $S_A$ is initialized to be equal to the plurality of resources $S_M$. At 710, the sample candidate resource set $S_A$ is updated/reduced based on excluding resources that conflicts with other data associated with the Tx UE 104 (i.e., the source UE). At 712, the sample candidate resource set $S_A$ is updated/reduced based on excluding resources that are reserved by other UEs having proper RSRP and having a data priority $P_{RX}$ higher than a data priority $P_{TX}$. In some embodiment, $P_{TX}$ comprises a data priority associated with the Tx UE (e.g., the UE that is choosing the sample candidate resource set $S_A$) and $P_{RX}$ comprises a data priority associated with other UEs (e.g., the UE that has reserved the one or more resources). In some embodiments, the proper RSRP corresponds to an RSRP level that is greater than or equal to the resource exclusion RSRP threshold $T_{EX}$. In some embodiments, an RSRP level greater than the resource exclusion RSRP threshold $T_{EX}$ indicates that the resources are utilized by other UE's in close proximity to the Tx UE 104. In some embodiments, the RSRP of the resources is measured based on one or more reference signals associated therewith. At the end of 712, the sample candidate resource set $S_A$ comprises one or more candidate resources. In some embodiments, the one or more candidate resources comprise a set of reserved resources within the resource selection window. In some embodiments, the set of reserved resources comprises an RSRP level less than a predefined exclusion RSRP threshold and has a data priority level $P_{RX}$ less than a data priority level $P_{TX}$ of the UE that is choosing the set of reserved resources.

At 714, a determination is made whether a number of candidate resources in the sample candidate resource set $S_A$ (that is updated) comprises less than a predefined required candidate resource number B1|$S_M$|, where B1 is a predefined required candidate resource threshold. If No at 714, the algorithm 700 proceeds to 718, where a candidate resource set S is selected based on choosing first B2|$S_M$| resources from the sample candidate resource set $S_A$, where B2 is a predefined maximum candidate resource threshold. Therefore, in some embodiments, the candidate resource set S comprises one or more reserved resources comprising a subset of the set of reserved resources within the sample candidate resource set $S_A$. Therefore, in some embodiments, the one or more reserved resources within the candidate resource set S comprises an RSRP level less than a predefined exclusion RSRP threshold and has a data priority level $P_{RX}$ less than a data priority level $P_{TX}$ of the UE that is choosing the one or more reserved resources. In some embodiments, the first B2|SM| resources is selected from the sample candidate resource set $S_A$, in accordance with a ranking based on whether the resource is reserved by another UE and based on the data priority if reserved, as explained above with respect to algorithm 600 in FIG. 6. If yes at 714, the algorithm proceeds to 716, where the resource exclusion RSRP threshold $T_{EX}$ is increased. Then the algorithm proceeds to 708, where the selection of the sample candidate resource set $S_A$ is repeated based on the increased resource exclusion RSRP threshold $T_{EX}$.

As indicated with respect to FIGS. 6-7, in some embodiments, the Tx UE 104 is configured to select the candidate resource set based on pre-emption. In other words, in some embodiments, the Tx UE 104 is configured to select a candidate resource set comprising one or more reserved resources comprising reserved resources that are reserved by one or more other UEs. Referring back to FIG. 1, in some embodiments, the Tx UE 104 may be configured to select a candidate resource set comprising one or more reserved resources that are reserved by the Rx UE 106.

Figure 8:
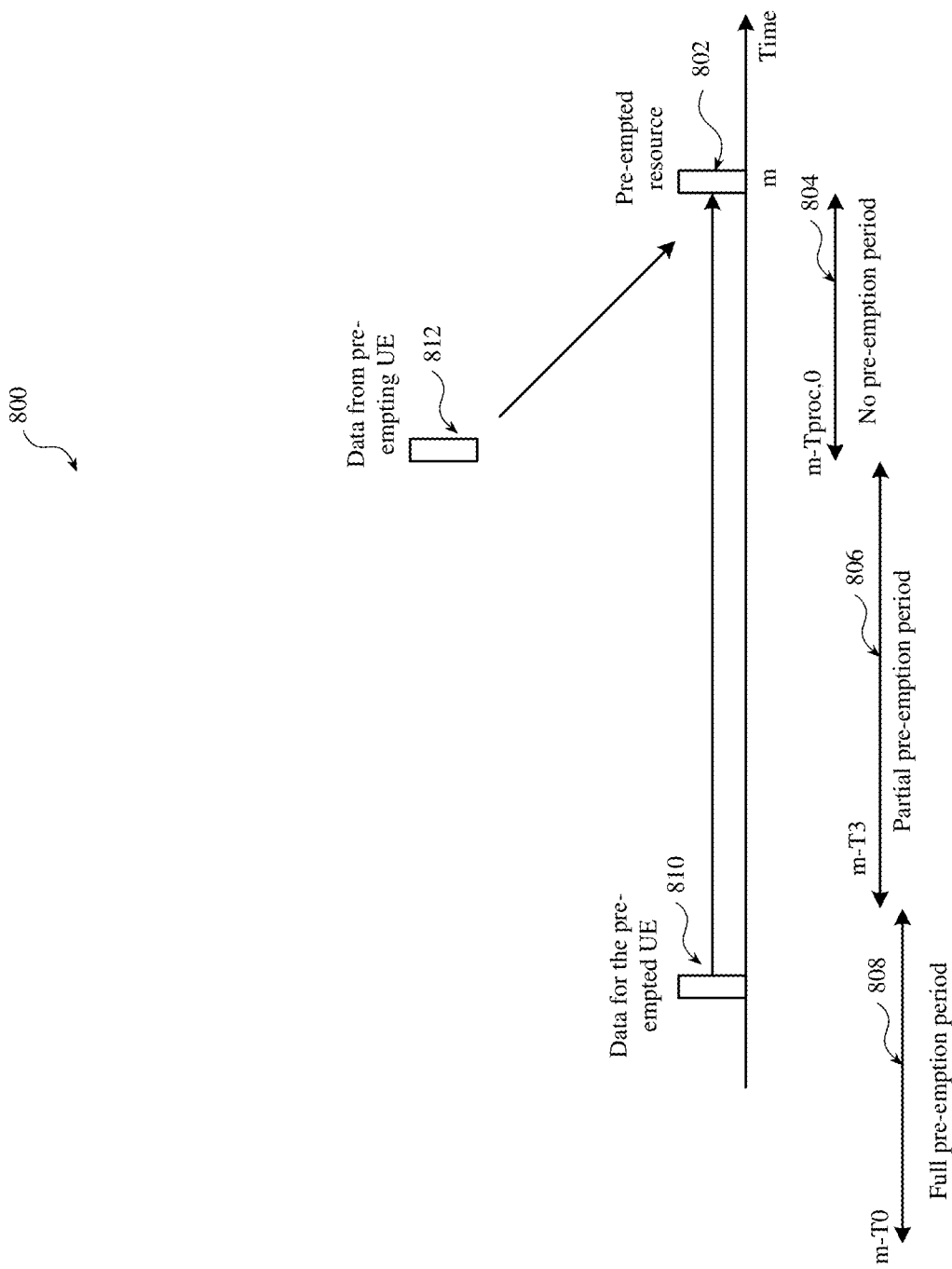
FIG. 8 depicts a pre-empted UE timeline for the reception of a preemption message at the pre-empted UE, according to one embodiment of the disclosure.

In some embodiments, when the Tx UE 104 has a data (e.g., a high priority data) to transmit using a reserved resource associated with the Rx UE 106 within the candidate resource set, the Tx UE 104 is configured to generate a pre-emption message 112 that indicates an intention to utilize the reserved resource associated with the Rx UE 106. In some embodiments, the pre-emption message 112 comprise a sidelink control information (SCI) from the Tx UE 104. In such embodiments, the Tx UE 104 comprises a pre-empting UE and the Rx UE 106 comprises a pre-empted UE. Therefore, in such embodiments, the Tx UE 104 may be referred to as a pre-empting UE 104 and the Rx UE 106 may be referred to as a pre-empted UE 106. In some embodiments, the reserved resource within the candidate resource set that is chosen by the Tx UE 104 (i.e., the pre-empting UE) for data transmission comprise a pre-empted resource. In such embodiments, the pre-empted UE 106 is configured to receive the pre-emption message 112 and selectively continue transmission of a data associated with the pre-empted UE 106 using the pre-empted resource, based on a time of reception of the pre-emption message 112 at the Rx UE 106. In particular, FIG. 8 depicts a pre-empted UE timeline 800 for the reception of a preemption message (e.g., the pre-emption message 112) at the pre-empted UE 106 according to one embodiment of the disclosure. Therefore, FIG. 8 is explained herein with reference to the pre-empting UE 104 in FIG. 1 and the pre-empted UE 106 in FIG. 1. In this embodiment, the pre-empted resource 802 is at a time slot m. In some embodiments, the pre-emption message 112 from a pre-empting UE 104 is received at the pre-empted UE 106 at slot t, where km. In some embodiments, the pre-emption message 112 indicates an intention to utilize the pre-empted resource 802 for the data 812 associated with the pre-empting UE 104.

In some embodiments, when the pre-emption message 112 is received at the pre-empted UE 106 during a no pre-emption time period [m-Tproc,0, m] 804 that precedes the slot m of the pre-empted resource 802 in time domain, the pre-empted UE 106 is configured to continue transmission of a data 810 associated with the pre-empted UE 106 using the pre-empted resource 802. In some embodiments, the no pre-emption time period 804 defines a time period that is less than a time Tproc,0 required by the pre-empted UE 106 to decode/process the pre-emption message 112. In particular, Tproc,0 is considered as UE processing time of SCI decoding and sidelink measurement. Alternately, in other embodiments, when the pre-emption message 112 is received at the pre-empted UE 106 during a partial pre-emption time period [m-T3, m-Tproc,0] 806 that precedes the no pre-emption time period 804, the pre-empted UE 106 is configured to not transmit the data 810 associated with the pre-empted UE 106 using the pre-empted resource 802. In some embodiments, the T3 corresponds to a resource reselection processing time associated with the pre-empted resource 802 in order to perform resource reselection. In some embodiments, the partial pre-emption period 806 defines a time period that is after a time period associated with a sensing window defined for re-selection of resources for the pre-empted resource 802 and that is before the no pre-emption time period 804. In some embodiments, the partial pre-emption period 806 defines a time period that is less than a resource reselection processing time and greater than UE processing time of SCI decoding and sidelink measurement.

Further, in some embodiments, when the pre-emption message 112 is received at the pre-empted UE 106 during a full pre-emption time period [m-T0, m-T3] 808 that precedes the partial pre-emption time period 806, the pre-empted UE 106 is configured to not transmit the data 810 associated with the pre-empted UE 106 using the pre-empted resource 802. In some embodiments, the pre-empted UE 106 is further configured to reselect a resource for transmitting the data 810 associated with the pre-empted UE 106, when the pre-emption message 112 is received at the pre-empted UE 106 during a full pre-emption time period [m-T0, m-T3] 808. In some embodiments, the T0 corresponds to a sensing window size associated with the pre-empted resource 802. In some embodiments, the full pre-emption period 808 defines a time period that is during a time period associated with a sensing window defined for re-selection of resources for the pre-empted resource 802 and that is greater than the resource reselection processing time T3.

In some embodiments, the pre-empted UE 106 is configured to reselect the resource for transmitting the data 810 associated with the pre-empted UE 106, in accordance with a data priority level of the data 810 associated with the pre-empted UE 106. For example, for the lowest priority data, resource reselection may not be performed. In some embodiments, the pre-empted UE 106 is configured to reselect the resource for transmitting the data 810 associated with the pre-empted UE 106 from a resource reselection window that starts after a slot associated with a last reserved resource of the pre-empted UE 106. In some embodiments, a width of the reselection window may be defined as [n+S1, n+S2], where n is the slot of the last reserved resource, and where S1 and S2 are defined in accordance with the data priority level of the data 810 associated with the pre-empted UE 106.

Figure 9:
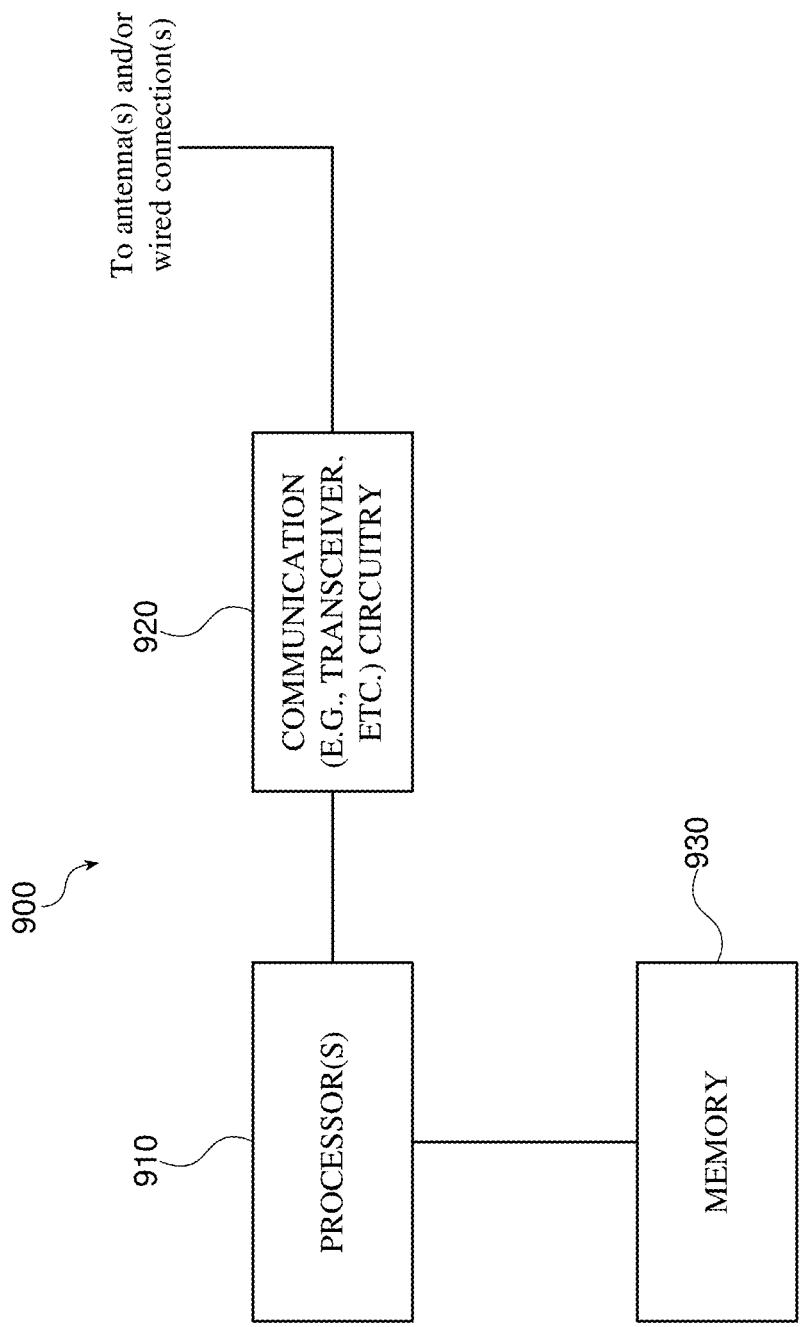
FIG. 9 illustrates a block diagram of an apparatus employable at a Base Station (BS), eNodeB, gNodeB or other network device, according to various aspects described herein.

Referring to FIG. 9, illustrated is a block diagram of an apparatus 900 employable at a Base Station (BS), eNodeB, gNodeB or other network device, according to various aspects described herein. In some embodiments, the apparatus 900 may be included within the gNodeB 102 in FIG. 1. However, in other embodiments, the apparatus 900 could be included within any gNodeB associated with a new radio (NR) system. The apparatus 900 can include one or more processors 910 (e.g., one or more baseband processors such as one or more of the baseband processors discussed in connection with FIG. 15 and/or FIG. 16) comprising processing circuitry 910 and associated interface(s) (e.g., one or more interface(s) discussed in connection with FIG. 16), transceiver circuitry 920 (e.g., which can comprise circuitry for one or more wired (e.g., X2, etc.) connections and/or part or all of RF circuitry 1506, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 930 (which can comprise any of a variety of storage mediums and can store instructions and/or data associated with one or more of processor(s) 910 or transceiver circuitry 920).

In particular, the term memory is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 900 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 910, transceiver circuitry 920, and the memory 930 can be included in a single device, while in other aspects, they can be included in different devices, such as part of a distributed architecture.

Figure 10:
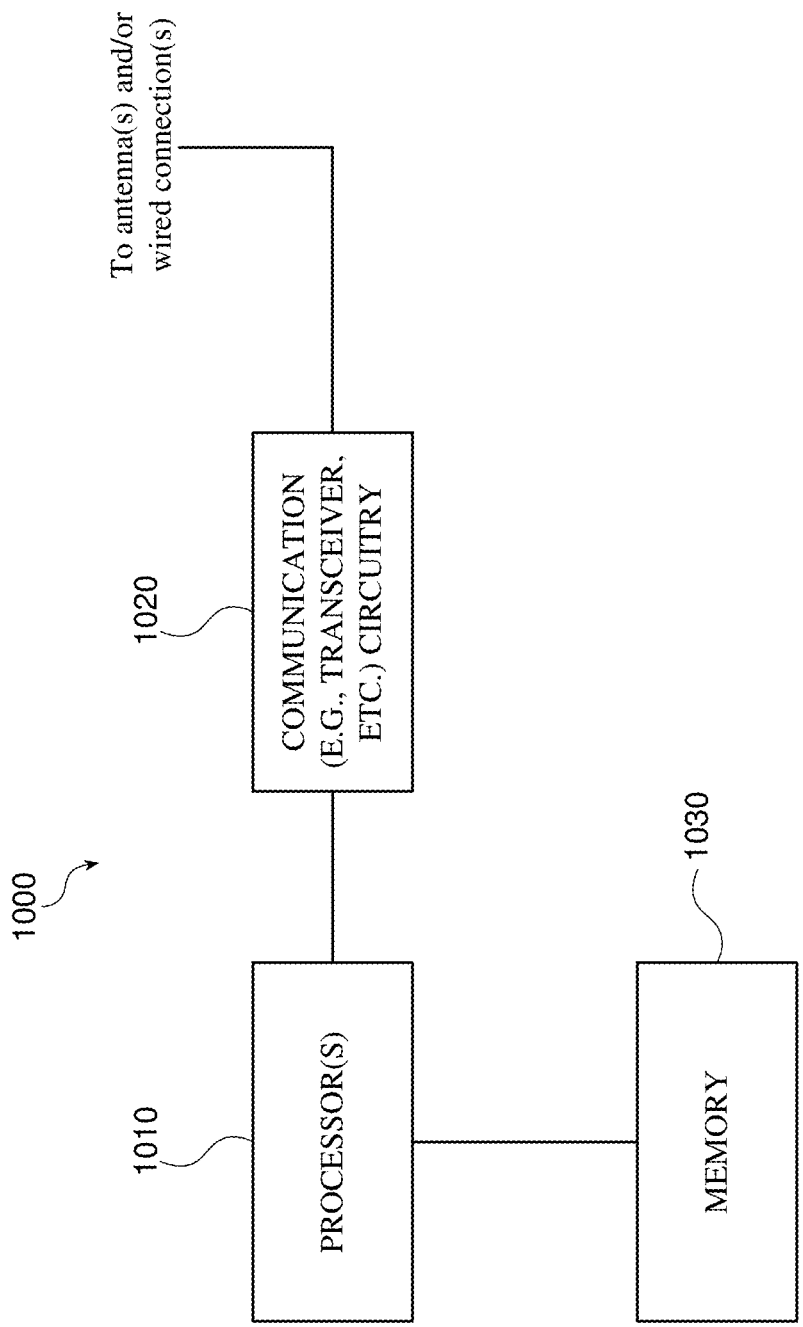
FIG. 10 illustrates a block diagram of an apparatus employable at a user equipment (UE) or other network device (e.g., IoT device), according to various aspects described herein.

Referring to FIG. 10, illustrated is a block diagram of an apparatus 1000 employable at a user equipment (UE) or other network device (e.g., IoT device), according to various aspects described herein. In some embodiments, the apparatus 1000 may be included within the UE 104 in FIG. 1 and the UE 106 in FIG. 1. However, in other embodiments, the apparatus 1000 could be included within any UE associated with a new radio (NR) system. Apparatus 1000 can include one or more processors 1010 (e.g., one or more baseband processors such as one or more of the baseband processors discussed in connection with FIG. 15 and/or FIG. 16) comprising processing circuitry and associated interface(s) (e.g., one or more interface(s) discussed in connection with FIG. 16), transceiver circuitry 1020 (e.g., comprising part or all of RF circuitry 1506, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 1030 (which can comprise any of a variety of storage mediums and can store instructions and/or data associated with one or more of processor(s) 1010 or transceiver circuitry 1020). In particular, the term memory is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 1000 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 1010) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s)

1010) can comprise one or more of: identifying physical resources associated with the signal/message, detecting the signal/message, resource element group deinterleaving, demodulation, descrambling, and/or decoding.

Figure 11:
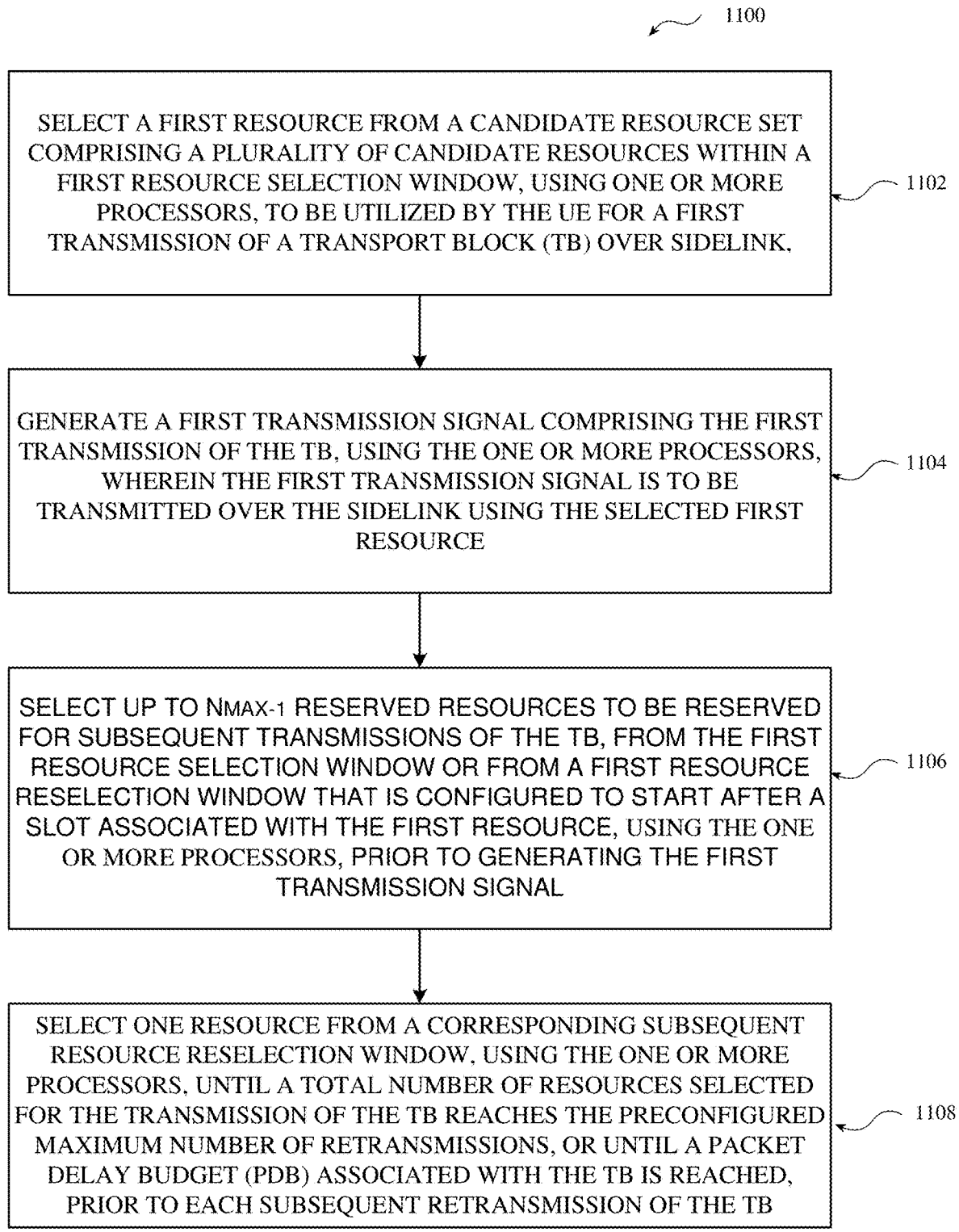
FIG. 11 illustrates a flow chart of a method for resource re-selection for a user equipment (UE) in a new radio (NR) system, according to one embodiment of the disclosure.

FIG. 11 illustrates a flow chart of a method 1100 for resource re-selection for a user equipment (UE) in a new radio (NR) system, according to one embodiment of the disclosure. The method 1100 is explained herein with reference to the apparatus 1000 in FIG. 10 and the resource selection procedures 200 and 300 in FIG. 2 and FIG. 3, respectively. In some embodiments, the apparatus 1000 could be included within the UE 104 in FIG. 1. Therefore, the method 1100 is further explained with reference to the NR system 100 in FIG. 1. At 1102, a first resource to be utilized by a UE (e.g., the UE 104 in FIG. 1) for a first transmission of a transport block (TB) over sidelink (e.g., the sidelink 108 in FIG. 1), is selected using the one or more processors 1010, from a candidate resource set comprising a plurality of candidate resources within a first resource selection window. In some embodiments, a size of the first resource selection window is derived based on a (pre) configured maximum number of retransmissions of the TB. At 1104, a first transmission signal (e.g., the first transmission signal 110 in FIG. 1) comprising the first transmission of the TB is generated, using the one or more processors 1010. In some embodiments, the first transmission signal is to be transmitted over the sidelink using the selected first resource.

At 1106, up to Nmax−1 reserved resources to be reserved for subsequent transmissions of the TB, is selected from the first resource selection window or from a first resource reselection window (e.g., the first resource re-selection window 208 in FIG. 2) that is configured to start after a slot associated with the first resource, using the one or more processors 1010, prior to generating the first transmission signal. For example, in some embodiments, up to Nmax−1 reserved resources to be reserved for subsequent transmissions of the TB, is selected from the first resource selection window, as explained above in FIG. 3. Alternately, in some embodiments, up to Nmax−1 reserved resources to be reserved for subsequent transmissions of the TB, is selected from the first resource reselection window that is configured to start after a slot associated with the first resource, as explained above in FIG. 2.

At 1108, prior to each subsequent retransmission of the TB, one resource is selected from a corresponding subsequent resource reselection window, using the one or more processors, until a total number of resources selected for the transmission of the TB reaches the (pre)configured maximum number of retransmissions, or until a packet delay budget (PDB) associated with the TB is reached. In some embodiments, each of the resource reselection windows start at m+P1 slots, wherein m is the slot of the last selected resource for the TB and a number of slots in P1 is chosen based on whether hybrid automatic repeat request (HARQ) feedback is enabled or not, and based on HARQ feedback time if the HARQ feedback is enabled. In some embodiments, a window duration of each of the resource reselection windows is chosen in a way that the PDB associated with the TB is not exceeded and a predefined resource reservation window size is not exceeded. In some embodiments, P1 is equal to 1, when HARQ feedback is disabled. Alternately, in other embodiments, P1 is derived based on physical sidelink feedback channel (PSFCH) periodicity and a processing time associated with a physical sidelink control channel (PSCCH) or a physical sidelink shared channel (PSSCH), when HARQ feedback is enabled.

Figure 12:
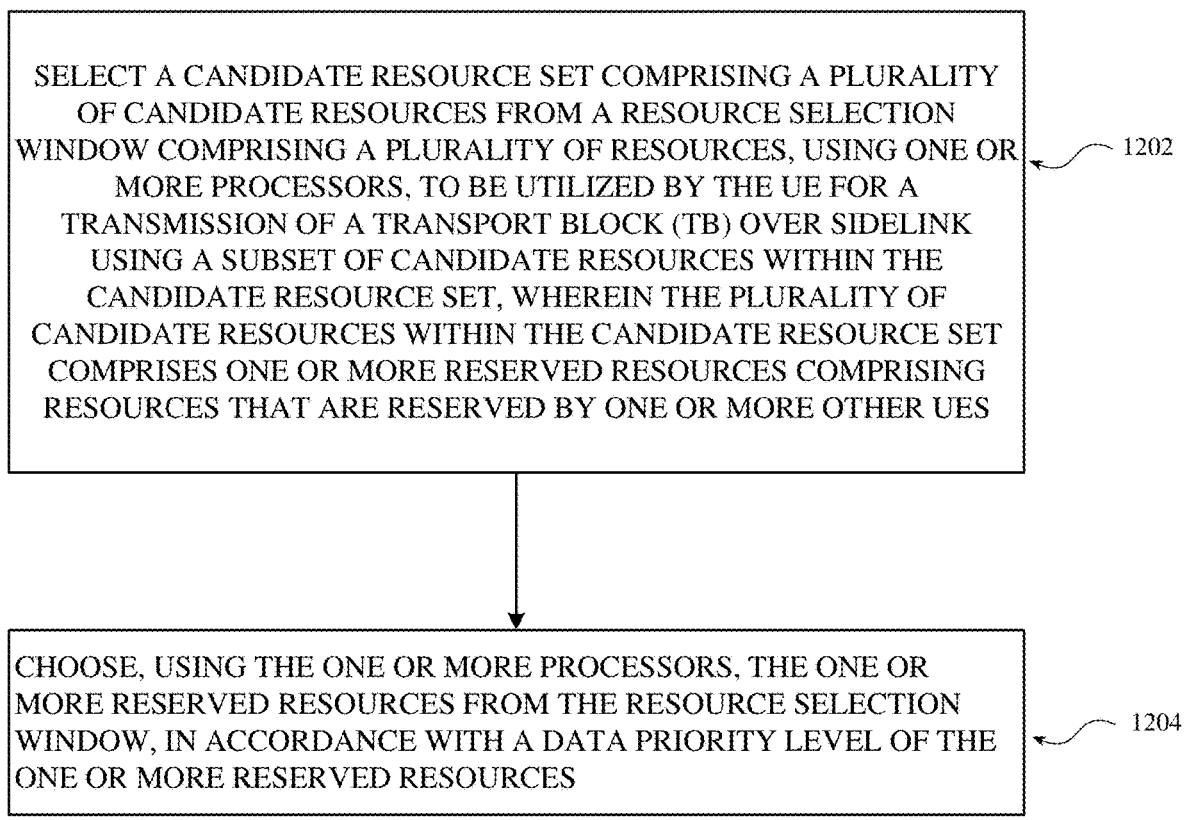
FIG. 12 illustrates a flow chart of a method for resource pre-emption for a user equipment (UE) in a new radio (NR) system, according to one embodiment of the disclosure.

FIG. 12 illustrates a flow chart of a method 1200 for resource pre-emption for a user equipment (UE) in a new radio (NR) system, according to one embodiment of the disclosure. The method 1200 is explained herein with reference to the apparatus 1000 in FIG. 10, and the algorithms 600 and 700 for determining a candidate resource set based on pre-emption in FIG. 6 and FIG. 7, respectively. In some embodiments, the apparatus 1000 could be included within the UE 104 in FIG. 1. Therefore, the method 1200 is further explained with reference to the NR system 100 in FIG. 1. At 1202, a candidate resource set comprising a plurality of candidate resources from a resource selection window comprising a plurality of resources, is selected using the one or more processors 1010, to be utilized by a UE (e.g., the UE 104 in FIG. 1) for a transmission of a transport block (TB) over sidelink (e.g., the sidelink 108 in FIG. 1) using a subset of candidate resources within the candidate resource set. In some embodiments, the plurality of candidate resources within the candidate resource set comprises one or more reserved resources comprising resources that are reserved by one or more other UEs (e.g., the UE 106 in FIG. 1).

At 1204, the one or more reserved resources from the resource selection window is chosen, using the one or more processors 1010, in accordance with a data priority level of the one or more reserved resources. In one embodiment, the one or more reserved resources are chosen from the resource selection window, using the one or more processors 1010, when a number of candidate resources chosen from the resource selection window, in order to form the candidate resource set, based on choosing a set of resources that are reserved by other UEs and having an RSRP level less than a predefined upper bound exclusion RSRP threshold is below a predefined required candidate resource number, as explained above with respect to the algorithm 600 in FIG. 6. In such embodiments, the one or more reserved resources comprises a reference signal receive power (RSRP) level that is greater than or equal to a predefined upper bound exclusion RSRP threshold.

In such embodiments, the one or more reserved resources are chosen from one or more sets of reserved resources within the resource selection window, wherein the one or more sets of reserved resources are chosen based on choosing a set of reserved resources with lowest data priority level within the resource selection window, and repeatedly choosing subsequent sets of reserved resources within the resource selection window by increasing the data priority level, until the number of candidate resources chosen from the resource selection window, in order to form the candidate resource set, is greater than or equal to the predefined required candidate resource number. In some embodiments, the reserved resources within the one or more sets of the reserved resources comprises an RSRP level that is greater than or equal to the predefined upper bound exclusion RSRP threshold. In some embodiments, choosing the set of reserved resources for each data priority level comprises choosing a group of reserved resources having RSRP level below a predefined RSRP threshold and repeatedly choosing subsequent groups of reserved resources by increasing the RSRP threshold, until a predefined maximum RSRP threshold is reached.

Alternately, in another embodiment, the one or more reserved resources are chosen from the resource selection window based on choosing a set of reserved resources within the resource selection window that has an RSRP level less than a predefined exclusion RSRP threshold and that has a data priority level $P_{RX}$ less than a data priority level $P_{TX}$ of the UE that is choosing the one or more reserved resources, as explained above with respect to the algorithm 700 in FIG. 7. In such embodiments, the set of reserved resources comprises the one or more reserved resources. In some embodiments, the predefined exclusion RSRP threshold is defined based on the data priority level $P_{RX}$ and the data priority level $P_{TX}$.

Figure 13:
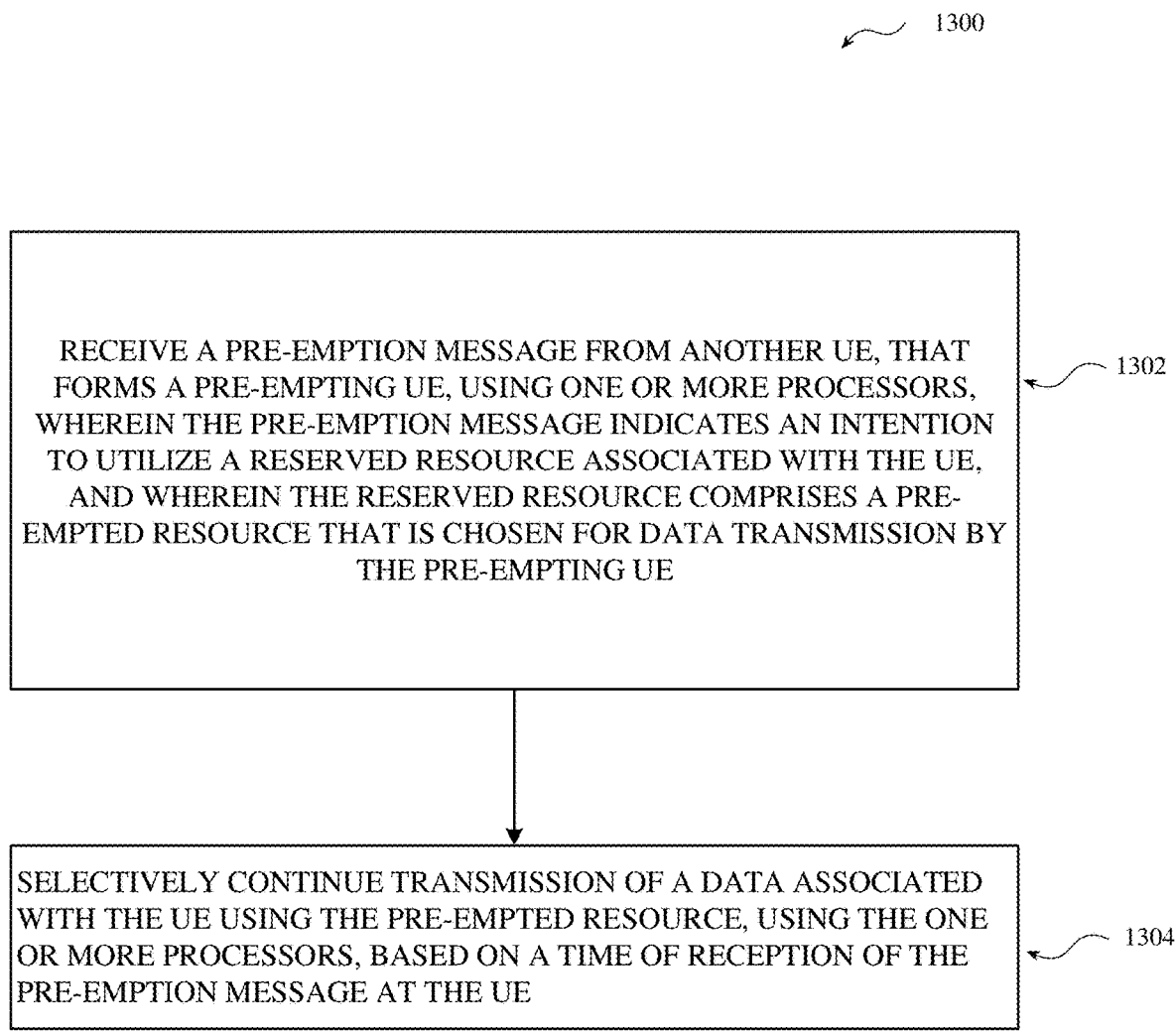
FIG. 13 illustrates a flow chart of a method for a pre-empted user equipment (UE) in a new radio (NR) system, according to one embodiment of the disclosure.

FIG. 13 illustrates a flow chart of a method 1300 for a pre-empted user equipment (UE) in a new radio (NR) system, according to one embodiment of the disclosure. The method 1300 is explained herein with reference to the apparatus 1000 in FIG. 10, and the pre-empted UE timeline 800 in FIG. 8. In some embodiments, the apparatus 1000 could be included within the Rx UE 106 in FIG. 1. Therefore, the method 1300 is further explained with reference to the NR system 100 in FIG. 1. At 1302, a pre-emption message (e.g., the pre-emption message 112 in FIG. 1) is received at a UE (e.g., the Rx UE 106 in FIG. 1) from another UE, that forms a pre-empting UE (e.g., the Tx UE 104 in FIG. 1), using the one or more processors 1010. In some embodiments, the UE that receives the pre-emption message comprises a pre-empted UE (e.g. the Rx UE 106 in FIG. 1). In some embodiments, the pre-emption message indicates an intention to utilize a reserved resource associated with the pre-empted UE (e.g., the Rx UE 106 in FIG. 1). In some embodiments, the reserved resource comprises a pre-empted resource (e.g., the pre-empted resource 802 in FIG. 8) that is chosen for data transmission by the pre-empting UE.

At 1304, transmission of a data (e.g., the data 810 in FIG. 8) associated with the pre-empted UE (e.g., the Rx UE 106 in FIG. 1) is selectively continued using the pre-empted resource, using the one or more processors, based on a time of reception of the pre-emption message at the pre-empted UE. In particular, when the pre-emption message is received at the pre-empted UE during a no pre-emption time period (e.g., the no pre-emption period 804 in FIG. 8) that precedes the pre-empted resource in time domain, the one or more processors 1010 is configured to continue transmission of the data associated with the pre-empted UE using the pre-empted resource. In some embodiments, the no pre-emption time period defines a time period that is less than a UE processing time required by the pre-empted UE to decode the pre-emption message.

Alternately, when the pre-emption message is received at the pre-empted UE during a partial pre-emption time period (e.g., the partial pre-emption time period 806 in FIG. 8) that precedes the no pre-emption time period, the one or more processors 1010 is configured to not transmit the data associated with the pre-empted UE using the pre-empted resource. In some embodiments, the partial pre-emption period defines a time period that is less than a resource reselection processing time for re-selection of resources for the pre-empted resource and that is greater than the UE processing time. Further, in some embodiments, when the pre-emption message is received at the pre-empted UE during a full pre-emption time period (e.g., the full pre-emption time period 808 in FIG. 8) that precedes the partial pre-emption time period, the one or more processors 1010 is configured to not transmit the data associated with the pre-empted UE using the pre-empted resource. In some embodiments, the full pre-emption period defines a time period that is during a time period associated with a sensing window of the UE and that is greater than the resource reselection processing time. Furthermore, when the pre-emption message is received at the pre-empted UE during the full pre-emption time period, the one or more processors is configured to reselect a resource for transmitting the data associated with the pre-empted UE.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 14:
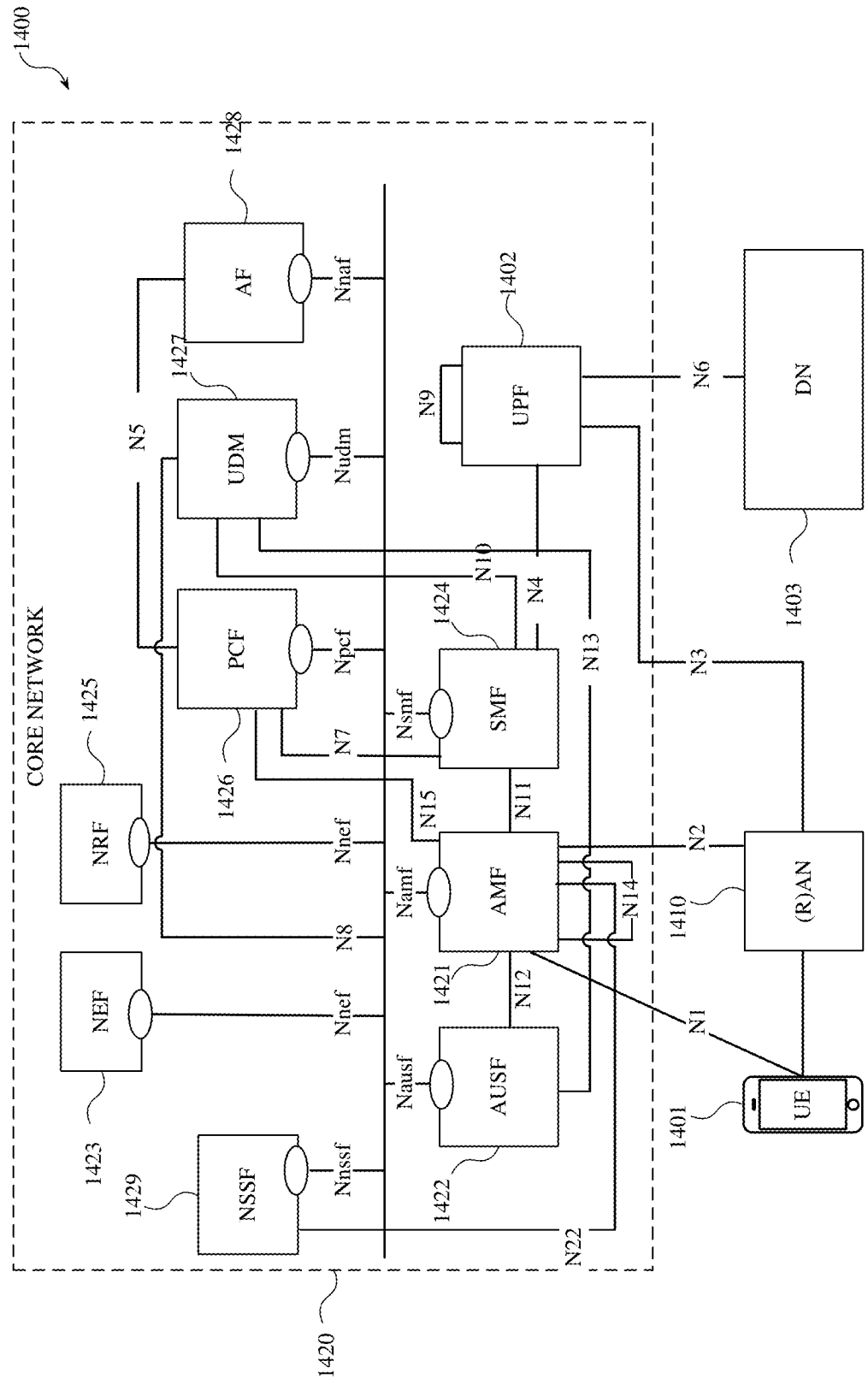
FIG. 14 illustrates an architecture of a system including a Core Network (CN), for example a Fifth Generation (5G) CN (5GC), in accordance with various embodiments.

Embodiments described herein can be implemented into a system using any suitably configured hardware and/or software. FIG. 14 illustrates an architecture of a system 1400 including a Core Network (CN) 1420, for example a Fifth Generation (5G) CN (5GC), in accordance with various embodiments. The system 1400 is shown to include a UE 1401, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 1420. The 5GC 1420 can comprise one or more of the following functions and network components: an Authentication Server Function (AUSF) 1422; an Access and Mobility Management Function (AMF) 1421; a Session Management Function (SMF) 1424; a Network Exposure Function (NEF) 1423; a Policy Control Function (PCF) 1426; a Network Repository Function (NRF) 1425; a Unified Data Management (UDM) 1427; an Application Function (AF) 1428; a User Plane (UP) Function (UPF) 1402; and a Network Slice Selection Function (NSSF) 1429.

The UPF 1402 can act as an anchor point for intra-RAT and inter-RAT mobility, an external Protocol Data Unit (PDU) session point of interconnect to DN 1403, and a branching point to support multi-homed PDU session. The UPF 1402 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 1402 can include an uplink classifier to support routing traffic flows to a data network. The DN 1403 can represent various network operator services, Internet access, or third-party services. DN 1403 can include, or be similar to, an application server. The UPF 1402 can interact with the SMF 1424 via an N4 reference point between the SMF 1424 and the UPF 1402.

The AUSF 1422 can store data for authentication of UE 1401 and handle authentication-related functionality. The AUSF 1422 can facilitate a common authentication framework for various access types. The AUSF 1422 can communicate with the AMF 1421 via an N12 reference point between the AMF 1421 and the AUSF 1422; and can communicate with the UDM 1427 via an N13 reference point between the UDM 1427 and the AUSF 1422. Additionally, the AUSF 1422 can exhibit an Nausf service-based interface.

The AMF 1421 can be responsible for registration management (e.g., for registering UE 1401, etc.), connection management, reachability management, mobility management, and lawful interception of AMF-related events, and access authentication and authorization. The AMF 1421 can be a termination point for the an N11 reference point between the AMF 1421 and the SMF 1424. The AMF 1421 can provide transport for SM messages between the UE 1401 and the SMF 1424, and act as a transparent proxy for routing SM messages. AMF 1421 can also provide transport for SMS messages between UE 1401 and a Short Message Service (SMS) Function (SMSF) (not shown in FIG. 14). AMF 1421 can act as SEcurity Anchor Function (SEAF), which can include interaction with the AUSF 1422 and the UE 1401 and/or receipt of an intermediate key that was established as a result of the UE 1401 authentication process. Where Universal Subscriber Identity Module (USIM) based authentication is used, the AMF 1421 can retrieve the security material from the AUSF 1422. AMF 1421 can also include a Single-Connection Mode (SCM) function, which receives a key from the SEA that it uses to derive access-network specific keys. Furthermore, AMF 1421 can be a termination point of a RAN Control Plane (CP) interface, which can include or be an N2 reference point between the (R)AN 1410 and the AMF 1421; and the AMF 1421 can be a termination point of Non Access Stratum (NAS) (N1) signaling, and perform NAS ciphering and integrity protection.

AMF 1421 can also support NAS signaling with a UE 1401 over an Non-3GPP (N3) Inter Working Function (IWF) interface. The N3IWF can be used to provide access to untrusted entities. N3IWF can be a termination point for the N2 interface between the (R)AN 1410 and the AMF 1421 for the control plane, and can be a termination point for the N3 reference point between the (R)AN 1410 and the UPF 1402 for the user plane. As such, the AMF 1421 can handle N2 signaling from the SMF 1424 and the AMF 1421 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 1401 and AMF 1421 via an N1 reference point between the UE 1401 and the AMF 1421, and relay uplink and downlink user-plane packets between the UE 1401 and UPF 1402. The N3IWF also provides mechanisms for IPsec tunnel establishment with the UE 1401. The AMF 1421 can exhibit an Namf service-based interface, and can be a termination point for an N14 reference point between two AMFs 1421 and an N17 reference point between the AMF 1421 and a 5G Equipment Identity Register (5G-EIR) (not shown in FIG. 14).

The UE 1401 can be registered with the AMF 1421 in order to receive network services. Registration Management (RM) is used to register or deregister the UE 1401 with the network (e.g., AMF 1421), and establish a UE context in the network (e.g., AMF 1421). The UE 1401 can operate in an RM-REGISTERED state or an RM-DEREGISTERED state. In the RM-DEREGISTERED state, the UE 1401 is not registered with the network, and the UE context in AMF 1421 holds no valid location or routing information for the UE 1401 so the UE 1401 is not reachable by the AMF 1421. In the RM-REGISTERED state, the UE 1401 is registered with the network, and the UE context in AMF 1421 can hold a valid location or routing information for the UE 1401 so the UE 1401 is reachable by the AMF 1421. In the RM-REGISTERED state, the UE 1401 can perform mobility Registration Update procedures, perform periodic Registration Update procedures triggered by expiration of the periodic update timer (e.g., to notify the network that the UE 1401 is still active), and perform a Registration Update procedure to update UE capability information or to re-negotiate protocol parameters with the network, among others.

The AMF 1421 can store one or more RM contexts for the UE 1401, where each RM context is associated with a specific access to the network. The RM context can be a data structure, database object, etc. that indicates or stores, inter alia, a registration state per access type and the periodic update timer. The AMF 1421 can also store a 5GC Mobility Management (MM) context that can be the same or similar to an (Enhanced Packet System (EPS))MM ((E)MM) context. In various embodiments, the AMF 1421 can store a Coverage Enhancement (CE) mode B Restriction parameter of the UE 1401 in an associated MM context or RM context. The AMF 1421 can also derive the value, when needed, from the UE's usage setting parameter already stored in the UE context (and/or MM/RM context).

Connection Management (CM) can be used to establish and release a signaling connection between the UE 1401 and the AMF 1421 over the N1 interface. The signaling connection is used to enable NAS signaling exchange between the UE 1401 and the CN 1420, and comprises both the signaling connection between the UE and the AN (e.g., RRC connection or UE-N3IWF connection for non-3GPP access) and the N2 connection for the UE 1401 between the AN (e.g., RAN 1410) and the AMF 1421. The UE 1401 can operate in one of two CM states, CM-IDLE mode or CM-CONNECTED mode. When the UE 1401 is operating in the CM-IDLE state/mode, the UE 1401 may have no NAS signaling connection established with the AMF 1421 over the N1 interface, and there can be (R)AN 1410 signaling connection (e.g., N2 and/or N3 connections) for the UE 1401. When the UE 1401 is operating in the CM-CONNECTED state/mode, the UE 1401 can have an established NAS signaling connection with the AMF 1421 over the N1 interface, and there can be a (R)AN 1410 signaling connection (e.g., N2 and/or N3 connections) for the UE 1401. Establishment of an N2 connection between the (R)AN 1410 and the AMF 1421 can cause the UE 1401 to transition from CM-IDLE mode to CM-CONNECTED mode, and the UE 1401 can transition from the CM-CONNECTED mode to the CM-IDLE mode when N2 signaling between the (R)AN 1410 and the AMF 1421 is released.

The SMF 1424 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 1401 and a data network (DN) 1403 identified by a Data Network Name (DNN). PDU sessions can be established upon UE 1401 request, modified upon UE 1401 and 5GC 1420 request, and released upon UE 1401 and 5GC 1420 request using NAS SM signaling exchanged over the N1 reference point between the UE 1401 and the SMF 1424. Upon request from an application server, the 5GC 1420 can trigger a specific application in the UE 1401. In response to receipt of the trigger message, the UE 1401 can pass the trigger message (or relevant parts/information of the trigger message) to one or more identified applications in the UE 1401. The identified application(s) in the UE 1401 can establish a PDU session to a specific DNN. The SMF 1424 can check whether the UE 1401 requests are compliant with user subscription information associated with the UE 1401. In this regard, the SMF 1424 can retrieve and/or request to receive update notifications on SMF 1424 level subscription data from the UDM 1427.

The SMF 1424 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 1424 can be included in the system 1400, which can be between another SMF 1424 in a visited network and the SMF 1424 in the home network in roaming scenarios. Additionally, the SMF 1424 can exhibit the Nsmf service-based interface.

The NEF 1423 can provide means for securely exposing the services and capabilities provided by 3GPP network functions for third party, internal exposure/re-exposure, Application Functions (e.g., AF 1428), edge computing or fog computing systems, etc. In such embodiments, the NEF 1423 can authenticate, authorize, and/or throttle the AFs. NEF 1423 can also translate information exchanged with the AF 1428 and information exchanged with internal network functions. For example, the NEF 1423 can translate between an AF-Service-Identifier and an internal 5GC information. NEF 1423 can also receive information from other network functions (NFs) based on exposed capabilities of other network functions. This information can be stored at the NEF 1423 as structured data, or at a data storage NF using standardized interfaces. The stored information can then be re-exposed by the NEF 1423 to other NFs and AFs, and/or used for other purposes such as analytics. Additionally, the NEF 1423 can exhibit an Nnef service-based interface.

The NRF 1425 can support service discovery functions, receive NF discovery requests from NF instances, and provide the information of the discovered NF instances to the NF instances. NRF 1425 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 1425 can exhibit the Nnrf service-based interface.

The PCF 1426 can provide policy rules to control plane function(s) to enforce them, and can also support unified policy framework to govern network behavior. The PCF 1426 can also implement an FE to access subscription information relevant for policy decisions in a UDR of the UDM 1427. The PCF 1426 can communicate with the AMF 1421 via an N15 reference point between the PCF 1426 and the AMF 1421, which can include a PCF 1426 in a visited network and the AMF 1421 in case of roaming scenarios. The PCF 1426 can communicate with the AF 1428 via an N5 reference point between the PCF 1426 and the AF 1428; and with the SMF 1424 via an N7 reference point between the PCF 1426 and the SMF 1424. The system 1400 and/or CN 1420 can also include an N24 reference point between the PCF 1426 (in the home network) and a PCF 1426 in a visited network. Additionally, the PCF 1426 can exhibit an Npcf service-based interface.

The UDM 1427 can handle subscription-related information to support the network entities' handling of communication sessions, and can store subscription data of UE 1401. For example, subscription data can be communicated between the UDM 1427 and the AMF 1421 via an N8 reference point between the UDM 1427 and the AMF. The UDM 1427 can include two parts, an application Functional Entity (FE) and a Unified Data Repository (UDR) (the FE and UDR are not shown in FIG. 1). The UDR can store subscription data and policy data for the UDM 1427 and the PCF 1426, and/or structured data for exposure and application data (including Packet Flow Descriptions (PFDs) for application detection, application request information for multiple UEs 1401) for the NEF 1423. The Nudr service-based interface can be exhibited by the UDR 221 to allow the UDM 1427, PCF 1426, and NEF 1423 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 1424 via an N10 reference point between the UDM 1427 and the SMF 1424. UDM 1427 can also support SMS management, wherein an SMS-FE implements similar application logic as discussed elsewhere herein. Additionally, the UDM 1427 can exhibit the Nudm service-based interface.

The AF 1428 can provide application influence on traffic routing, provide access to NEF 1423, and interact with the policy framework for policy control. 5GC 1420 and AF 1428 can provide information to each other via NEF 1423, which can be used for edge computing implementations. In such implementations, the network operator and third party services can be hosted close to the UE 1401 access point of attachment to achieve an efficient service delivery through the reduced end-to-end latency and load on the transport network. For edge computing implementations, the 5GC can select a UPF 1402 close to the UE 1401 and execute traffic steering from the UPF 1402 to DN 1403 via the N6 interface. This can be based on the UE subscription data, UE location, and information provided by the AF 1428. In this way, the AF 1428 can influence UPF (re)selection and traffic routing. Based on operator deployment, when AF 1428 is considered to be a trusted entity, the network operator can permit AF 1428 to interact directly with relevant NFs. Additionally, the AF 1428 can exhibit an Naf service-based interface.

The NSSF 1429 can select a set of network slice instances serving the UE 1401. The NSSF 1429 can also determine allowed Network Slice Selection Assistance Information (NSSAI) and the mapping to the subscribed Single NSSAIs (S-NSSAIs), as appropriate. The NSSF 1429 can also determine the AMF set to be used to serve the UE 1401, or a list of candidate AMF(s) 1421 based on a suitable configuration and possibly by querying the NRF 1425. The selection of a set of network slice instances for the UE 1401 can be triggered by the AMF 1421 with which the UE 1401 is registered by interacting with the NSSF 1429, which can lead to a change of AMF 1421. The NSSF 1429 can interact with the AMF 1421 via an N22 reference point between AMF 1421 and NSSF 1429; and can communicate with another NSSF 1429 in a visited network via an N31 reference point (not shown in FIG. 14). Additionally, the NSSF 1429 can exhibit an Nnssf service-based interface.

As discussed previously, the CN 1420 can include an SMSF, which can be responsible for SMS subscription checking and verification, and relaying SM messages to/from the UE 1401 to/from other entities, such as an SMS-Gateway Mobile services Switching Center (GMSC)/Inter-Working MSC (IWMSC)/SMS-router. The SMSF can also interact with AMF 1421 and UDM 1427 for a notification procedure that the UE 1401 is available for SMS transfer (e.g., set a UE not reachable flag, and notifying UDM 1427 when UE 1401 is available for SMS).

The CN 1420 can also include other elements that are not shown in FIG. 14, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 14 for clarity. In one example, the CN 1420 can include an Nx interface, which is an inter-CN interface between the MME (e.g., a non-5G MME) and the AMF 1421 in order to enable interworking between CN 1420 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 15:
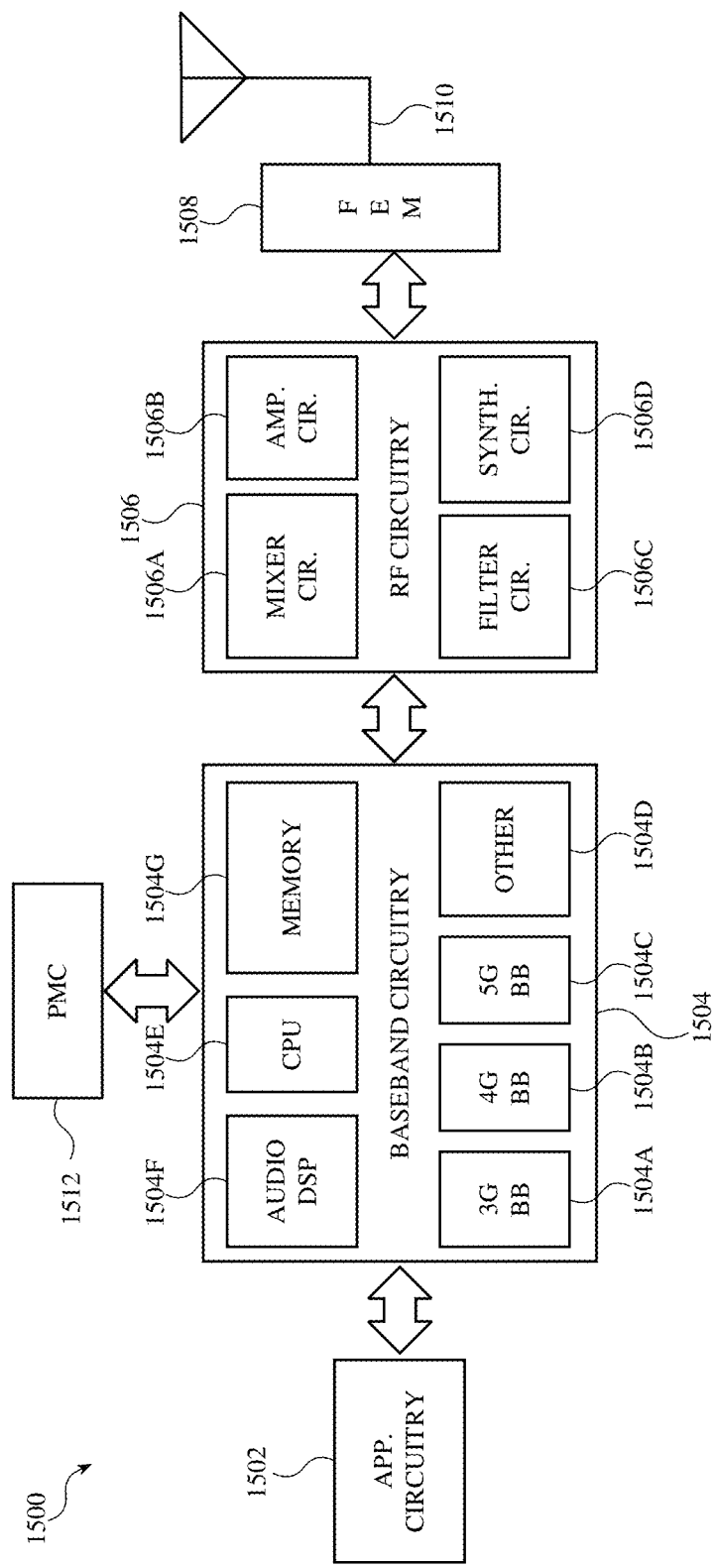
FIG. 15 illustrates example components of a device in accordance with some embodiments.

FIG. 15 illustrates example components of a device 1500 in accordance with some embodiments. In some embodiments, the device 1500 can include application circuitry 1502, baseband circuitry 1504, Radio Frequency (RF) circuitry 1506, front-end module (FEM) circuitry 1508, one or more antennas 1510, and power management circuitry (PMC) 1512 coupled together at least as shown. The components of the illustrated device 1500 can be included in a UE or a RAN node. In some embodiments, the device 1500 can include fewer elements (e.g., a RAN node may not utilize application circuitry 1502, and instead include a processor/controller to process IP data received from a CN such as 5GC 1420 or an Evolved Packet Core (EPC)). In some embodiments, the device 1500 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 1502 can include one or more application processors. For example, the application circuitry 1502 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1500. In some embodiments, processors of application circuitry 1502 can process IP data packets received from an EPC.

The baseband circuitry 1504 can include circuitry such as, but not limited to, one or more single-core or multi-core processors. The baseband circuitry 1504 can include one or more baseband processors or control logic to process baseband signals received from a receive signal path of the RF circuitry 1506 and to generate baseband signals for a transmit signal path of the RF circuitry 1506. Baseband processing circuitry 1504 can interface with the application circuitry 1502 for generation and processing of the baseband signals and for controlling operations of the RF circuitry 1506. For example, in some embodiments, the baseband circuitry 1504 can include a third generation (3G) baseband processor 1504A, a fourth generation (4G) baseband processor 1504B, a fifth generation (5G) baseband processor 1504C, or other baseband processor(s) 1504D for other existing generations, generations in development or to be developed in the future (e.g., second generation (2G), sixth generation (6G), etc.). The baseband circuitry 1504 (e.g., one or more of baseband processors 1504A-D) can handle various radio control functions that enable communication with one or more radio networks via the RF circuitry 1506. In other embodiments, some or all of the functionality of baseband processors 1504A-D can be included in modules stored in the memory 1504G and executed via a Central Processing Unit (CPU) 1504E. The radio control functions can include, but are not limited to, signal modulation/demodulation, encoding/decoding, radio frequency shifting, etc. In some embodiments, modulation/demodulation circuitry of the baseband circuitry 1504 can include Fast-Fourier Transform (FFT), precoding, or constellation mapping/demapping functionality. In some embodiments, encoding/decoding circuitry of the baseband circuitry 1504 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 1504 can include one or more audio digital signal processor(s) (DSP) 1504F. The audio DSP(s) 1504F can include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 1504 and the application circuitry 1502 can be implemented together such as, for example, on a system on a chip (SOC).

In some embodiments, the baseband circuitry 1504 can provide for communication compatible with one or more radio technologies. For example, in some embodiments, the baseband circuitry 1504 can support communication with a NG-RAN, an evolved universal terrestrial radio access network (EUTRAN) or other wireless metropolitan area networks (WMAN), a wireless local area network (WLAN), a wireless personal area network (WPAN), etc. Embodiments in which the baseband circuitry 1504 is configured to support radio communications of more than one wireless protocol can be referred to as multi-mode baseband circuitry.

RF circuitry 1506 can enable communication with wireless networks using modulated electromagnetic radiation through a non-solid medium. In various embodiments, the RF circuitry 1506 can include switches, filters, amplifiers, etc. to facilitate the communication with the wireless network. RF circuitry 1506 can include a receive signal path which can include circuitry to down-convert RF signals received from the FEM circuitry 1508 and provide baseband signals to the baseband circuitry 1504. RF circuitry 1506 can also include a transmit signal path which can include circuitry to up-convert baseband signals provided by the baseband circuitry 1504 and provide RF output signals to the FEM circuitry 1508 for transmission.

In some embodiments, the receive signal path of the RF circuitry 1506 can include mixer circuitry 1506a, amplifier circuitry 1506b and filter circuitry 1506c. In some embodiments, the transmit signal path of the RF circuitry 1506 can include filter circuitry 1506c and mixer circuitry 1506a. RF circuitry 1506 can also include synthesizer circuitry 1506d for synthesizing a frequency for use by the mixer circuitry 1506a of the receive signal path and the transmit signal path. In some embodiments, the mixer circuitry 1506a of the receive signal path can be configured to down-convert RF signals received from the FEM circuitry 1508 based on the synthesized frequency provided by synthesizer circuitry 1506d. The amplifier circuitry 1506b can be configured to amplify the down-converted signals and the filter circuitry 1506c can be a low-pass filter (LPF) or band-pass filter (BPF) configured to remove unwanted signals from the down-converted signals to generate output baseband signals. Output baseband signals can be provided to the baseband circuitry 1504 for further processing. In some embodiments, the output baseband signals can be zero-frequency baseband signals, although this is not a requirement. In some embodiments, mixer circuitry 1506a of the receive signal path can comprise passive mixers, although the scope of the embodiments is not limited in this respect.

In some embodiments, the mixer circuitry 1506a of the transmit signal path can be configured to up-convert input baseband signals based on the synthesized frequency provided by the synthesizer circuitry 1506d to generate RF output signals for the FEM circuitry 1508. The baseband signals can be provided by the baseband circuitry 1504 and can be filtered by filter circuitry 1506c.

In some embodiments, the mixer circuitry 1506a of the receive signal path and the mixer circuitry 1506a of the transmit signal path can include two or more mixers and can be arranged for quadrature downconversion and upconversion, respectively. In some embodiments, the mixer circuitry 1506a of the receive signal path and the mixer circuitry 1506a of the transmit signal path can include two or more mixers and can be arranged for image rejection (e.g., Hartley image rejection). In some embodiments, the mixer circuitry 1506a of the receive signal path and the mixer circuitry 1506a can be arranged for direct downconversion and direct upconversion, respectively. In some embodiments, the mixer circuitry 1506a of the receive signal path and the mixer circuitry 1506a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 1506 can include analog-to-digital converter (ADC) and digital-to-analog converter (DAC) circuitry and the baseband circuitry 1504 can include a digital baseband interface to communicate with the RF circuitry 1506.

In some dual-mode embodiments, a separate radio IC circuitry can be provided for processing signals for each spectrum, although the scope of the embodiments is not limited in this respect.

In some embodiments, the synthesizer circuitry 1506d can be a fractional-N synthesizer or a fractional N/N+1 synthesizer, although the scope of the embodiments is not limited in this respect as other types of frequency synthesizers can be suitable. For example, synthesizer circuitry 1506d can be a delta-sigma synthesizer, a frequency multiplier, or a synthesizer comprising a phase-locked loop with a frequency divider.

The synthesizer circuitry 1506d can be configured to synthesize an output frequency for use by the mixer circuitry 1506a of the RF circuitry 1506 based on a frequency input and a divider control input. In some embodiments, the synthesizer circuitry 1506d can be a fractional N/N+1 synthesizer.

In some embodiments, frequency input can be provided by a voltage controlled oscillator (VCO), although that is not a requirement. Divider control input can be provided by either the baseband circuitry 1504 or the applications processor 1502 depending on the desired output frequency. In some embodiments, a divider control input (e.g., N) can be determined from a look-up table based on a channel indicated by the applications processor 1502.

Synthesizer circuitry 1506d of the RF circuitry 1506 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1506 can include an IQ/polar converter.

FEM circuitry 1508 can include a receive signal path which can include circuitry configured to operate on RF signals received from one or more antennas 1510, amplify the received signals and provide the amplified versions of the received signals to the RF circuitry 1506 for further processing. FEM circuitry 1508 can also include a transmit signal path which can include circuitry configured to amplify signals for transmission provided by the RF circuitry 1506 for transmission by one or more of the one or more antennas 1510. In various embodiments, the amplification through the transmit or receive signal paths can be done solely in the RF circuitry 1506, solely in the FEM 1508, or in both the RF circuitry 1506 and the FEM 1508.

In some embodiments, the FEM circuitry 1508 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1506). The transmit signal path of the FEM circuitry 1508 can include a power amplifier (PA) to amplify input RF signals (e.g., provided by RF circuitry 1506), and one or more filters to generate RF signals for subsequent transmission (e.g., by one or more of the one or more antennas 1510).

In some embodiments, the PMC 1512 can manage power provided to the baseband circuitry 1504. In particular, the PMC 1512 can control power-source selection, voltage scaling, battery charging, or DC-to-DC conversion. The PMC 1512 can often be included when the device 1500 is capable of being powered by a battery, for example, when the device is included in a UE. The PMC 1512 can increase the power conversion efficiency while providing desirable implementation size and heat dissipation characteristics.

While FIG. 15 shows the PMC 1512 coupled only with the baseband circuitry 1504. However, in other embodiments, the PMC 1512 may be additionally or alternatively coupled with, and perform similar power management operations for, other components such as, but not limited to, application circuitry 1502, RF circuitry 1506, or FEM 1508.

In some embodiments, the PMC 1512 can control, or otherwise be part of, various power saving mechanisms of the device 1500. For example, if the device 1500 is in an RRC_Connected state, where it is still connected to the RAN node as it expects to receive traffic shortly, then it can enter a state known as Discontinuous Reception Mode (DRX) after a period of inactivity. During this state, the device 1500 can power down for brief intervals of time and thus save power.

If there is no data traffic activity for an extended period of time, then the device 1500 can transition off to an RRC_Idle state, where it disconnects from the network and does not perform operations such as channel quality feedback, handover, etc. The device 1500 goes into a very low power state and it performs paging where again it periodically wakes up to listen to the network and then powers down again. The device 1500 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1502 and processors of the baseband circuitry 1504 can be used to execute elements of one or more instances of a protocol stack. For example, processors of the baseband circuitry 1504, alone or in combination, can be used execute Layer 3, Layer 2, or Layer 1 functionality, while processors of the application circuitry 1504 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 16:
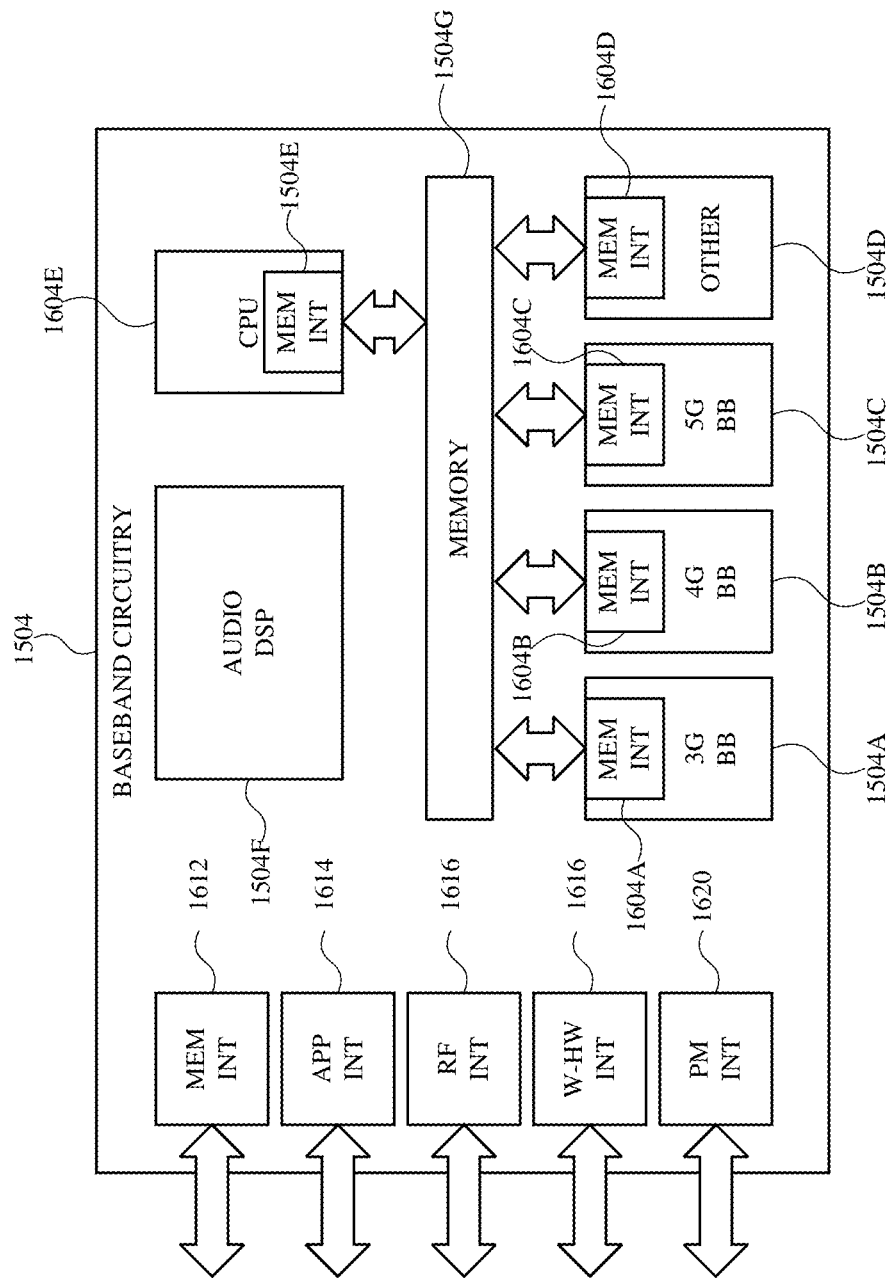
FIG. 16 illustrates example interfaces of baseband circuitry in accordance with some embodiments.

FIG. 16 illustrates example interfaces of baseband circuitry in accordance with some embodiments. As discussed above, the baseband circuitry 1504 of FIG. 2 can comprise processors 1504A-1504E and a memory 1504G utilized by said processors. Each of the processors 1504A-1504E can include a memory interface, 1604A-1604E, respectively, to send/receive data to/from the memory 1504G.

The baseband circuitry 1504 can further include one or more interfaces to communicatively couple to other circuitries/devices, such as a memory interface 1612 (e.g., an interface to send/receive data to/from memory external to the baseband circuitry 1504), an application circuitry interface 1614 (e.g., an interface to send/receive data to/from the application circuitry 1502 of FIG. 2), an RF circuitry interface 1616 (e.g., an interface to send/receive data to/from RF circuitry 1506 of FIG. 2), a wireless hardware connectivity interface 1618 (e.g., an interface to send/receive data to/from Near Field Communication (NFC) components, Bluetooth® components (e.g., Bluetooth® Low Energy), Wi-Fi® components, and other communication components), and a power management interface 1620 (e.g., an interface to send/receive power or control signals to/from the PMC 1512).

In various aspects, embodiments discussed herein can facilitate techniques of inter-cell BM (Beam Management) via L1 (Layer 1) via one or more variations of a first set of techniques and/or a second set of techniques. The first set of techniques discussed herein can facilitate L1 inter-cell BM via SSB (Synchronization Signal Block). The second set of techniques discussed herein can facilitate L1 inter-cell BM via Synchronization CSI (Channel State Information)-RS (Reference Signal).

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in a user equipment (UE) associated with a new radio (NR) system, comprising one or more processors configured to select a first resource from a candidate resource set comprising a plurality of candidate resources within a first resource selection window, wherein the first resource is to be utilized by the UE for a first transmission of a transport block (TB) over sidelink, wherein a size of the first resource selection window is derived based on a (pre)configured maximum number of retransmissions of the TB; and generate a first transmission signal comprising the first transmission of the TB, to be transmitted over the sidelink using the selected first resource.

Example 2 is an apparatus, including the subject matter of example 1, wherein, prior to generating the first transmission signal, the one or more processors is further configured to select up to Nmax−1 reserved resources to be reserved for subsequent transmissions of the TB, from the first resource selection window or from a first resource reselection window that is configured to start after a slot associated with the first resource, wherein Nmax is a predefined reserved resource number comprising a maximum number of resources reserved before each transmission of the TB.

Example 3 is an apparatus, including the subject matter of examples 1-2, including or omitting elements, wherein the one or more processors is configured to select the Nmax−1 reserved resources from the candidate resource set within the first selection window, during the first resource selection window.

Example 4 is an apparatus, including the subject matter of examples 1-3, including or omitting elements, wherein the one or more processors is configured to select the Nmax−1 reserved resources from a candidate resource set within the first resource reselection window.

Example 5 is an apparatus, including the subject matter of examples 1-4, including or omitting elements, wherein, prior to each subsequent retransmission of the TB, the one or more processors is further configured to select one resource from a corresponding subsequent resource reselection window, until a total number of resources selected for the transmission of the TB reaches the (pre)configured maximum number of retransmissions, or until a packet delay budget (PDB) associated with the TB is reached.

Example 6 is an apparatus, including the subject matter of examples 1-5, including or omitting elements, wherein each of the resource reselection windows start at m+P1 slots, wherein m is the slot of the last selected resource for the TB and a number of slots in P1 is chosen based on whether hybrid automatic repeat request (HARQ) feedback is enabled or not, and based on HARQ feedback time if the HARQ feedback is enabled.

Example 7 is an apparatus, including the subject matter of examples 1-6, including or omitting elements, wherein a window duration of each of the resource reselection windows is chosen in a way that the PDB associated with the TB is not exceeded and a predefined resource reservation window size is not exceeded.

Example 8 is an apparatus, including the subject matter of examples 1-7, including or omitting elements, wherein P1 is equal to 1, when HARQ feedback is disabled.

Example 9 is an apparatus, including the subject matter of examples 1-8, including or omitting elements, wherein P1 is derived based on physical sidelink feedback channel (PSFCH) periodicity and a processing time associated with a physical sidelink control channel (PSCCH) or a physical sidelink shared channel (PSSCH), when HARQ feedback is enabled.

Example 10 is an apparatus, including the subject matter of examples 1-9, including or omitting elements, wherein, in order to select up to Nmax−1 resources from a single resource selection window comprising the first resource selection window or the first resource reselection window, the one or more processors is configured to randomly select one or more resources from a candidate resource set associated with the single resource selection window, while updating the candidate resource set after the selection of each resource from the candidate resource set, in accordance with a time slot of a newly selected resource, until a required number of resources are selected.

Example 11 is an apparatus, including the subject matter of examples 1-10, including or omitting elements, wherein the candidate resource set is updated in accordance with the relation:

$$T's = Ts \cap [t-W, t-V] \cap [t+V, t+W]$$

Where t is the time slot of the newly selected resource,
T's is the updated time slots of the candidate resource set,
Ts is the previous time slots of the candidate resource set,
W is the size of resource reservation window minus 1, and
V is a number of time slots defined based on whether hybrid automatic repeat request (HARQ) feedback is enabled or not, and based on HARQ feedback time if the HARQ feedback is enabled.

Example 12 is an apparatus, including the subject matter of examples 1-11, including or omitting elements, wherein each transmission or retransmission of the TB includes information of up to Nmax−1 reserved resources for the TB, based on the (pre)configured maximum number of retransmissions.

Example 13 is an apparatus, including the subject matter of examples 1-12, including or omitting elements, wherein one or more retransmissions of the TB further includes information on resources utilized for the transmission of one or more previous transmissions, when less than Nmax−1 reserved resources are reserved for the corresponding retransmissions.

Example 14 is an apparatus configured to be employed in a user equipment (UE) associated with a new radio (NR) system, comprising one or more processors configured to select a candidate resource set comprising a plurality of candidate resources from a resource selection window comprising a plurality of resources, to be utilized by the UE for a transmission of a transport block (TB) over sidelink using a subset of candidate resources within the candidate resource set, wherein the plurality of candidate resources within the candidate resource set comprises one or more reserved resources comprising resources that are reserved by one or more other UEs, and wherein the one or more reserved resources are chosen from the resource selection window, in accordance with a data priority level of the one or more reserved resources.

Example 15 is an apparatus, including the subject matter of example 14, wherein the one or more reserved resources comprises a reference signal receive power (RSRP) level that is greater than or equal to a predefined upper bound exclusion RSRP threshold.

Example 16 is an apparatus, including the subject matter of examples 14-15, including or omitting elements, wherein the one or more reserved resources are chosen from the resource selection window, when a number of candidate resources chosen from the resource selection window, in order to form the candidate resource set, based on choosing a set of reserved resources that are reserved by other UEs and having an RSRP level less than the predefined upper bound exclusion RSRP threshold is below a predefined required candidate resource number.

Example 17 is an apparatus, including the subject matter of examples 14-16, including or omitting elements, wherein the one or more reserved resources are chosen from one or more sets of reserved resources within the resource selection window, wherein the one or more sets of reserved resources are chosen based on choosing a set of reserved resources with lowest data priority level within the resource selection window, and repeatedly choosing subsequent sets of reserved resources within the resource selection window by increasing the data priority level, until the number of candidate resources chosen from the resource selection window, in order to form the candidate resource set, is greater than or equal to the predefined required candidate resource number, wherein reserved resources within the one or more sets of the reserved resources comprises an RSRP level that is greater than or equal to the predefined upper bound exclusion RSRP threshold.

Example 18 is an apparatus, including the subject matter of examples 14-17, including or omitting elements, wherein choosing the set of reserved resources for each data priority level comprises choosing a group of reserved resources having RSRP level below a predefined RSRP threshold and repeatedly choosing subsequent groups of reserved resources by increasing the RSRP threshold, until a predefined maximum RSRP threshold is reached.

Example 19 is an apparatus, including the subject matter of examples 14-18, including or omitting elements, wherein the one or more reserved resources are chosen from the resource selection window based on choosing a set of reserved resources within the resource selection window that has an RSRP level less than a predefined exclusion RSRP threshold and that has a data priority level $P_{RX}$ less than a data priority level $P_{TX}$ of the UE that is choosing the one or more reserved resources.

Example 20 is an apparatus, including the subject matter of examples 14-19, including or omitting elements, wherein the predefined exclusion RSRP threshold is defined based on the data priority level $P_{RX}$ and the data priority level $P_{TX}$.

Example 21 is an apparatus, including the subject matter of examples 14-20, including or omitting elements, wherein the plurality of candidate resources within the candidate resource set are ranked based on whether candidate resources within the plurality of candidate resources comprise reserved resources or not, and based on the data priority level of the candidate resources, when the candidate resources comprise reserved resources.

Example 22 is an apparatus, including the subject matter of examples 14-21, including or omitting elements, wherein the one or more processors is configured to trigger a pre-emption procedure comprising selecting the candidate resource set comprising the one or more reserved resources associated with the one or more other UEs, when a data priority $P_{TX}$ of the UE is larger than a predefined transmit threshold $Th_{TX}$ or when a data priority $P_{RX}$ of the one or more other UEs is below a predefined receive threshold $Th_{RX}$ or when a gap between the data priority $P_{TX}$ and the data priority $P_{RX}$ is larger than a predefined threshold gap.

Example 23 is an apparatus configured to be employed in a user equipment (UE) associated with a new radio (NR) system, comprising one or more processors configured to receive a pre-emption message from another UE, that forms a pre-empting UE, wherein the pre-emption message indicates an intention to utilize a reserved resource associated with the UE, wherein the reserved resource comprises a pre-empted resource that is chosen for data transmission by the pre-empting UE; and selectively continue transmission of a data associated with the UE using the pre-empted resource, based on a time of reception of the pre-emption message at the UE.

Example 24 is an apparatus, including the subject matter of example 23, wherein, when the pre-emption message is received at the UE during a no pre-emption time period that precedes the pre-empted resource in time domain, wherein the no pre-emption time period defines a time period that is less than a UE processing time required by the UE to decode the pre-emption message, the one or more processors is configured to continue transmission of the data associated with the UE using the pre-empted resource.

Example 25 is an apparatus, including the subject matter of examples 23-24, including or omitting elements, wherein, when the pre-emption message is received at the UE during a partial pre-emption time period that precedes the no pre-emption time period, wherein the partial pre-emption period defines a time period that is less than a resource reselection processing time for re-selection of resources for the pre-empted resource and that is greater than the UE processing time, the one or more processors is configured to not transmit the data associated with the UE using the pre-empted resource.

Example 26 is an apparatus, including the subject matter of examples 23-25, including or omitting elements, wherein, when the pre-emption message is received at the UE during a full pre-emption time period that precedes the partial pre-emption time period, wherein the full pre-emption period defines a time period that is during a time period associated with a sensing window of the UE and that is greater than the resource reselection processing time, the one or more processors is configured to not transmit the data associated with the UE using the pre-empted resource.

Example 27 is an apparatus, including the subject matter of examples 23-26, including or omitting elements, wherein, when the pre-emption message is received at the UE during the full pre-emption time period, the one or more processors is further configured to reselect a resource for transmitting the data associated with the UE.

Example 28 is an apparatus, including the subject matter of examples 23-27, including or omitting elements, wherein the one or more processors is configured to reselect the resource for transmitting the data associated with the UE, in accordance with a data priority level of the data associated with the UE.

Example 29 is an apparatus, including the subject matter of examples 23-28, including or omitting elements, wherein the one or more processors is configured to reselect the resource for transmitting the data associated with the UE from a resource reselection window that starts after a slot associated with a last reserved resource of the UE, and wherein a width of the reselection window is defined in accordance with the data priority level of the data associated with the UE.

Example 30 is a method for a user equipment (UE) associated with a new radio (NR) system, comprising selecting a first resource from a candidate resource set comprising a plurality of candidate resources within a first resource selection window, using one or more processors, wherein the first resource is to be utilized by the UE for a first transmission of a transport block (TB) over sidelink, wherein a size of the first resource selection window is derived based on a (pre)configured maximum number of retransmissions of the TB; and generating a first transmission signal comprising the first transmission of the TB, using the one or more processors, wherein the first transmission signal is to be transmitted over the sidelink using the selected first resource.

Example 31 is a method, including the subject matter of example 30, further comprising, prior to generating the first transmission signal, selecting up to Nmax−1 reserved resources to be reserved for subsequent transmissions of the TB, from the first resource selection window or from a first resource reselection window that is configured to start after a slot associated with the first resource, using the one or more processors, wherein Nmax is a predefined reserved resource number comprising a maximum number of resources reserved before each transmission of the TB.

Example 32 is a method, including the subject matter of examples 30-31, including or omitting elements, wherein the Nmax−1 reserved resources are selected from the candidate resource set within the first resource selection window.

Example 33 is a method, including the subject matter of examples 30-32, including or omitting elements, wherein the Nmax−1 reserved resources are selected from a candidate resource set within the first resource reselection window that follows the first resource selection window.

Example 34 is a method, including the subject matter of examples 30-33, including or omitting elements, further comprising, prior to each subsequent retransmission of the TB, selecting one resource from a corresponding subsequent resource reselection window, using the one or more processors, until a total number of resources selected for the transmission of the TB reaches the (pre)configured maximum number of retransmissions, or until a packet delay budget (PDB) associated with the TB is reached.

Example 35 is a method, including the subject matter of examples 30-34, including or omitting elements, wherein each of the resource reselection windows start at m+P1 slots, wherein m is the slot of the last selected resource for the TB and a number of slots in P1 is chosen based on whether hybrid automatic repeat request (HARQ) feedback is enabled or not, and based on HARQ feedback time if the HARQ feedback is enabled.

Example 36 is a method, including the subject matter of examples 30-35, including or omitting elements, wherein a window duration of each of the resource reselection windows is chosen in a way that the PDB associated with the TB is not exceeded and a predefined resource reservation window size is not exceeded.

Example 37 is a method, including the subject matter of examples 30-36, including or omitting elements, wherein P1 is equal to 1, when HARQ feedback is disabled.

Example 38 is a method, including the subject matter of examples 30-37, including or omitting elements, wherein P1 is derived based on physical sidelink feedback channel (PSFCH) periodicity and a processing time associated with a physical sidelink control channel (PSCCH) or a physical sidelink shared channel (PSSCH), when HARQ feedback is enabled.

Example 39 is a method for a user equipment (UE) associated with a new radio (NR) system, comprising selecting a candidate resource set comprising a plurality of candidate resources from a resource selection window comprising a plurality of resources, using one or more processors, to be utilized by the UE for a transmission of a transport block (TB) over sidelink using a subset of candidate resources within the candidate resource set, wherein the plurality of candidate resources within the candidate resource set comprises one or more reserved resources comprising resources that are reserved by one or more other UEs, and choosing, using the one or more processors, the one or more reserved resources from the resource selection window, in accordance with a data priority level of the one or more reserved resources.

Example 40 is a method, including the subject matter of example 39, wherein the one or more reserved resources comprises a reference signal receive power (RSRP) level that is greater than or equal to a predefined upper bound exclusion RSRP threshold.

Example 41 is a method, including the subject matter of examples 39-40, including or omitting elements, wherein the one or more reserved resources are chosen from the resource selection window, using the one or more processors, when a number of candidate resources chosen from the resource selection window, in order to form the candidate resource set, based on choosing a set of resources that are reserved by other UEs and having an RSRP level less than the predefined upper bound exclusion RSRP threshold is below a predefined required candidate resource number.

Example 42 is a method, including the subject matter of examples 39-41, including or omitting elements, wherein the one or more reserved resources are chosen from one or more sets of reserved resources within the resource selection window, wherein the one or more sets of reserved resources are chosen based on choosing a set of reserved resources with lowest data priority level within the resource selection window, and repeatedly choosing subsequent sets of reserved resources within the resource selection window by increasing the data priority level, until the number of candidate resources chosen from the resource selection window, in order to form the candidate resource set, is greater than or equal to the predefined required candidate resource number, wherein reserved resources within the one or more sets of the reserved resources comprise an RSRP level that is greater than or equal to the predefined upper bound exclusion RSRP threshold.

Example 43 is a method, including the subject matter of examples 39-42, including or omitting elements, wherein choosing the set of reserved resources for each data priority level comprises choosing a group of reserved resources having RSRP level below a predefined RSRP threshold and repeatedly choosing subsequent groups of pre-empted resources by increasing the RSRP threshold, until a predefined maximum RSRP threshold is reached.

Example 44 is a method, including the subject matter of examples 39-43, including or omitting elements, wherein the one or more reserved resources are chosen from the resource selection window based on choosing a set of reserved resources within the resource selection window that has an RSRP level less than a predefined exclusion RSRP threshold and that has a data priority level $P_{RX}$ less than a data priority level $P_{TX}$ of the UE that is choosing the one or more reserved resources.

Example 45 is a method, including the subject matter of examples 39-44, including or omitting elements, wherein the predefined exclusion RSRP threshold is defined based on the data priority level $P_{RX}$ and the data priority level $P_{TX}$.

Example 46 is a method for a user equipment (UE) associated with a new radio (NR) system, comprising receiving a pre-emption message from another UE, that forms a pre-empting UE, using one or more processors, wherein the pre-emption message indicates an intention to utilize a reserved resource associated with the UE, and wherein the reserved resource comprises a pre-empted resource that is chosen for data transmission by the pre-empting UE; and selectively continuing transmission of a data associated with the UE using the pre-empted resource, using the one or more processors, based on a time of reception of the pre-emption message at the UE.

Example 47 is a method, including the subject matter of example 46, further comprising configuring the one or more processors to continue transmission of the data associated with the UE using the pre-empted resource, when the pre-emption message is received at the UE during a no pre-emption time period that precedes the pre-empted resource in time domain, wherein the no pre-emption time period defines a time period that is less than a UE processing time required by the UE to decode the pre-emption message.

Example 48 is a method, including the subject matter of examples 46-47, including or omitting elements, further comprising configuring the one or more processors to not transmit the data associated with the UE using the pre-empted resource, when the pre-emption message is received at the UE during a partial pre-emption time period that precedes the no pre-emption time period, wherein the partial pre-emption period defines a time period that is less than a resource reselection processing time for re-selection of resources for the pre-empted resource and that is greater than the UE processing time.

Example 49 is a method, including the subject matter of examples 46-48, including or omitting elements, further comprising configuring the one or more processors to not transmit the data associated with the UE using the pre-empted resource, when the pre-emption message is received at the UE during a full pre-emption time period that precedes the partial pre-emption time period, wherein the full pre-emption period defines a time period that is during a time period associated with a sensing window of the UE and that is greater than the resource reselection processing time.

Example 50 is a method, including the subject matter of examples 46-49, including or omitting elements, further comprising configuring the one or more processors to reselect a resource for transmitting the data associated with the UE, when the pre-emption message is received at the UE during the full pre-emption time period.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

What is claimed is:

1. An apparatus configured to be employed in a user equipment (UE) associated with a new radio (NR) system, comprising:
    one or more processors configured to:
        select a candidate resource set comprising a plurality of candidate resources from a resource selection window;
        determine that the plurality of candidate resources comprise a transmit resource of the UE and one or more reserved resources that are reserved by one or more other UEs;
        trigger a pre-emption procedure when a data priority $P_{TX}$ of the transmit resource is larger than a predefined transmit threshold $Th_{TX}$ and when a data priority $P_{RX}$ of the one or more reserved resources is below a predefined receive threshold $Th_{RX}$,
        the pre-emption procedure comprising selecting a subset of candidate resources from the one or more reserved resources in accordance with a data priority level of the one or more reserved resources;
            wherein the subset of candidate resources are chosen based on the one or more reserved resources with a lowest data priority level within the resource selection window, and repeatedly choosing subsequent sets of the one or more reserved resources by increasing the data priority level, until a number of candidate resources chosen from the resource selection window is greater than or equal to a predefined candidate resource number; and
        a radio frequency (RF) interface configured to provide, to RF circuitry, data for transmitting a transport block (TB) over sidelink using the subset of candidate resources.

2. The apparatus of claim 1, wherein the one or more reserved resources comprises a reference signal receive power (RSRP) level that is greater than or equal to a predefined upper bound exclusion RSRP threshold.

3. The apparatus of claim 2, wherein the one or more reserved resources are chosen based on a set of reserved resources that are reserved by other UEs and having an RSRP level less than the predefined upper bound exclusion RSRP threshold, and whether a number of candidate resources from the resource selection window is below a predefined required candidate resource number.

4. The apparatus of claim 1, wherein the one or more reserved resources comprise an RSRP level that is greater than or equal to a predefined upper bound exclusion RSRP threshold.

5. The apparatus of claim 1, wherein choosing a set of reserved resources for each data priority level comprises choosing a group of reserved resources having a RSRP level below a predefined RSRP threshold and repeatedly choosing subsequent groups of reserved resources by increasing the predefined RSRP threshold, until a predefined maximum RSRP threshold is reached.

6. The apparatus of claim 1, wherein the one or more reserved resources are chosen from the resource selection window based on choosing a set of reserved resources within the resource selection window that has an RSRP level less than a predefined exclusion RSRP threshold and that has a data priority level $P_{RX}$ less than a data priority level $P_{TX}$ of the UE that is choosing the one or more reserved resources.

7. The apparatus of claim 6, wherein the predefined exclusion RSRP threshold is defined based on the data priority level $P_{RX}$ and the data priority level $P_{TX}$.

8. The apparatus of claim 1, wherein the plurality of candidate resources within the candidate resource set are ranked based on whether candidate resources within the plurality of candidate resources comprise reserved resources or not, and based on the data priority level of the candidate resources, when the candidate resources comprise reserved resources.

9. The apparatus of claim 1, wherein the one or more processors is configured to trigger a pre-emption procedure comprising selecting the candidate resource set when a gap between the data priority $P_{TX}$ and the data priority $P_{RX}$ is larger than a predefined threshold gap.

10. A method for a user equipment (UE) associated with a new radio (NR) system, comprising:

selecting a candidate resource set comprising a plurality of candidate resources from a resource selection window;

determining that the plurality of candidate resources comprise a transmit resource of the UE and one or more reserved resources that are reserved by one or more other UEs;

triggering a pre-emption procedure when a data priority $P_{TX}$ of the transmit resource is larger than a predefined transmit threshold $Th_{TX}$ and when a data priority $P_{RX}$ of the one or more reserved resources is below a predefined receive threshold $Th_{RX}$, the pre-emption procedure comprising selecting a subset of candidate resources from the one or more reserved resources, in accordance with a data priority level of the one or more reserved resources;

wherein the subset of candidate resources are chosen based on the one or more reserved resources with a lowest data priority level within the resource selection window, and repeatedly choosing subsequent sets of the one or more reserved resources by increasing the data priority level, until a number of candidate resources chosen from the resource selection window is greater than or equal to a predefined candidate resource number; and transmitting a transport block (TB) over sidelink using the subset of candidate resources.

11. The method of claim 10, wherein the one or more reserved resources comprises a reference signal receive power (RSRP) level that is greater than or equal to a predefined upper bound exclusion RSRP threshold.

12. The method of claim 11, wherein the one or more reserved resources are chosen based on a set of resources that are reserved by other UEs and having an RSRP level less than the predefined upper bound exclusion RSRP threshold, and whether a number of candidate resources from the resource selection window is below a predefined required candidate resource number.

13. The method of claim 12, wherein the one or more reserved resources comprise an RSRP level that is greater than or equal to a predefined upper bound exclusion RSRP threshold.

14. The method of claim 10, wherein choosing a set of reserved resources for each data priority level comprises choosing a group of reserved resources having RSRP level below a predefined RSRP threshold and repeatedly choosing subsequent groups of pre-empted resources by increasing the predefined RSRP threshold, until a predefined maximum RSRP threshold is reached.

15. The method of claim 10, wherein the one or more reserved resources are chosen from the resource selection window based on choosing a set of reserved resources within the resource selection window that has an RSRP level less than a predefined exclusion RSRP threshold and that has a data priority level $P_{RX}$ less than a data priority level $P_{TX}$ of the UE that is choosing the one or more reserved resources.

16. The method of claim 15, wherein the predefined exclusion RSRP threshold is defined based on the data priority level $P_{RX}$ and the data priority level $P_{TX}$.

17. The method of claim 10, wherein a pre-emption procedure comprising selecting the candidate resource set when a gap between the data priority $P_{TX}$ and the data priority $P_{RX}$ is larger than a predefined threshold gap.

18. A baseband (BB) processor for a user equipment (UE), the BB processor configured to perform operations comprising:

selecting a candidate resource set comprising a plurality of candidate resources from a resource selection window;

determining that the plurality of candidate resources comprise a transmit resource of the UE and one or more reserved resources that are reserved by one or more other UEs;

triggering a pre-emption procedure when a data priority $P_{TX}$ of the transmit resource is larger than a predefined transmit threshold $Th_{TX}$ and when a data priority $P_{RX}$ of the one or more reserved resources is below a predefined receive threshold $Th_{RX}$, the pre-emption procedure comprising selecting a subset of candidate resources from the one or more reserved resources, in accordance with a data priority level of the one or more reserved resources; and wherein the subset of candidate resources are chosen based on the one or more reserved resources with a lowest data priority level within the resource selection window, and repeatedly choosing subsequent sets of the one or more reserved resources by increasing the data priority level, until a number of candidate resources chosen from the resource selection window is greater than or equal to a predefined candidate resource number; and transmitting a transport block (TB) over sidelink using the subset of candidate resources.

19. The BB processor of claim 18, wherein the one or more reserved resources comprises a reference signal receive power (RSRP) level that is greater than or equal to a predefined upper bound exclusion RSRP threshold.

20. The BB processor of claim 18, wherein a pre-emption procedure comprising selecting the candidate resource set when a gap between the data priority $P_{TX}$ and the data priority $P_{RX}$ is larger than a predefined threshold gap.

* * * * *